United States Patent
Park et al.

(10) Patent No.: US 9,386,593 B2
(45) Date of Patent: Jul. 5, 2016

(54) SYSTEMS AND METHODS FOR COMPONENT CARRIER SELECTION IN A WIRELESS COMMUNICATION SYSTEM

(75) Inventors: Kenneth James Park, Cathlament, WA (US); Ahmad Khoshnevis, Portland, OR (US); Kimihiko Imamura, Vancouver, WA (US); John M. Kowalski, Camas, WA (US); Sayantan Choudhury, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/488,478

(22) Filed: Jun. 19, 2009

(65) Prior Publication Data

US 2010/0322185 A1    Dec. 23, 2010

(51) Int. Cl.
*H04W 72/04* (2009.01)
*H04W 72/08* (2009.01)

(52) U.S. Cl.
CPC ........ *H04W 72/085* (2013.01); *H04W 72/0453* (2013.01)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 5,285,447 A * | 2/1994 | Hulsebosch | 370/332 |
| 5,691,974 A * | 11/1997 | Zehavi et al. | 370/203 |
| 7,966,017 B2 * | 6/2011 | Kim et al. | 455/436 |
| 8,559,992 B2 * | 10/2013 | Larsson et al. | 455/501 |
| 2004/0028015 A1 * | 2/2004 | Fouilland et al. | 370/337 |
| 2005/0075125 A1 * | 4/2005 | Bada et al. | 455/525 |
| 2005/0124344 A1 * | 6/2005 | Laroia et al. | 455/436 |
| 2005/0180364 A1 * | 8/2005 | Nagarajan et al. | 370/335 |
| 2005/0271012 A1 * | 12/2005 | Agrawal et al. | 370/331 |
| 2006/0153283 A1 * | 7/2006 | Scharf et al. | 375/148 |
| 2007/0177501 A1 * | 8/2007 | Papasakellariou | 370/229 |
| 2007/0195734 A1 * | 8/2007 | Das et al. | 370/335 |
| 2008/0227456 A1 * | 9/2008 | Huang et al. | 455/436 |
| 2008/0240439 A1 * | 10/2008 | Mukherjee et al. | 380/272 |
| 2008/0259876 A1 * | 10/2008 | Qiang et al. | 370/332 |

(Continued)

FOREIGN PATENT DOCUMENTS

| | | |
|---|---|---|
| CN | 101203034 A | 6/2008 |
| WO | 2010/125769 | 11/2010 |

OTHER PUBLICATIONS

Teyeb et al, Dynamic Relaying in 3GPP LTE-Advanced Networks, Jan. 2009, EURASIP Journal on Wireless Communication and Networking, vol. 2009, see entire document, pp. 1-10.*

(Continued)

*Primary Examiner* — Hassan Phillips
*Assistant Examiner* — Prenell Jones
(74) *Attorney, Agent, or Firm* — Austin Rapp & Hardman

(57) ABSTRACT

The present disclosure relates to component carrier (CC) selection in a wireless communication system. A user equipment (UE) that is in idle mode may receive a reference signal (RS) from an evolved Node B (eNB), obtain signal quality measurements with respect to the RS, and switch to a new CC based on the signal quality measurements. For a UE that is in connected mode, an eNB may obtain uplink channel condition information corresponding to uplink CCs, obtain downlink channel condition information corresponding to downlink CCs, and select a CC pair for the UE to use based on the uplink channel condition information and the downlink channel condition information.

7 Claims, 28 Drawing Sheets

(56) References Cited

U.S. PATENT DOCUMENTS

| | | | |
|---|---|---|---|
| 2008/0267131 A1 | 10/2008 | Kangude et al. | |
| 2009/0046625 A1* | 2/2009 | Diener et al. | 370/319 |
| 2009/0046656 A1* | 2/2009 | Kitazoe et al. | 370/331 |
| 2009/0046665 A1* | 2/2009 | Robson et al. | 370/332 |
| 2009/0088164 A1* | 4/2009 | Shen et al. | 455/436 |
| 2009/0124261 A1* | 5/2009 | Shimomura | 455/436 |
| 2009/0129336 A1* | 5/2009 | Osborn | 370/331 |
| 2009/0154588 A1* | 6/2009 | Chen et al. | 375/267 |
| 2009/0161527 A1* | 6/2009 | Yu | 370/203 |
| 2009/0180435 A1* | 7/2009 | Sarkar | 370/330 |
| 2009/0264077 A1* | 10/2009 | Damnjanovic | 455/63.1 |
| 2009/0279480 A1* | 11/2009 | Rosenqvist et al. | 370/328 |
| 2009/0285158 A1* | 11/2009 | Rezaiifar et al. | 370/328 |
| 2009/0296595 A1* | 12/2009 | Khoshnevis et al. | 370/252 |
| 2009/0316676 A1* | 12/2009 | Kolding et al. | 370/345 |
| 2010/0039948 A1* | 2/2010 | Agrawal et al. | 370/252 |
| 2010/0039950 A1* | 2/2010 | Kazmi | 370/252 |
| 2010/0054207 A1* | 3/2010 | Gupta et al. | 370/331 |
| 2010/0080187 A1* | 4/2010 | Papasakellariou et al. | 370/329 |
| 2010/0118992 A1* | 5/2010 | Terabe | 375/260 |
| 2010/0227614 A1* | 9/2010 | Chun et al. | 455/436 |
| 2010/0303039 A1* | 12/2010 | Zhang et al. | 370/331 |
| 2011/0013506 A1* | 1/2011 | Ishii et al. | 370/208 |
| 2011/0086639 A1* | 4/2011 | Kalervo Hamalainen et al. | 455/436 |
| 2011/0090879 A1* | 4/2011 | Hamiti et al. | 370/338 |
| 2011/0096713 A1* | 4/2011 | Rusert et al. | 370/312 |
| 2011/0117916 A1* | 5/2011 | Dahlen | 455/436 |
| 2011/0149913 A1* | 6/2011 | Park et al. | 370/332 |
| 2011/0275374 A1* | 11/2011 | Narasimha et al. | 455/436 |
| 2011/0286433 A1* | 11/2011 | Xiao et al. | 370/331 |
| 2012/0026976 A1* | 2/2012 | Chang et al. | 370/331 |
| 2012/0063417 A1* | 3/2012 | Redana et al. | 370/331 |
| 2012/0083199 A1* | 4/2012 | Redana et al. | 455/7 |
| 2012/0108283 A1* | 5/2012 | Pedersen et al. | 455/509 |
| 2014/0016602 A1* | 1/2014 | Papasakellariou et al. | 370/329 |

OTHER PUBLICATIONS

Nokia Siemens Networks, Nokia, "Use of Background Interference Matrix for Autonomous Component Carrier Selection for LTE-Advanced," R1-090736, Feb. 2009.
International Search Report issued for International Patent Application No. PCT/JP2010/057523 on Aug. 10, 2010.
3GPP TS 36.300 V8.1.0, "Evolved Universal Terrestrial Radio Access (E-UTRA) and Evolved Universal Terrestrial Radio Access Network (E-UTRAN); Overall description," Jun. 2007.
3GPP TS 36.331 V8.5.0, "Evolved Universal Terrestrial Radio Access (E-UTRA) Radio Resource Control (RRC); Protocol specification," Mar. 2009.
3GPP TS 36.321 V8.5.0, "Evolved Universal Terrestrial Radio Access (E-UTRA) Medium Access Control (MAC); Protocol specification," Mar. 2009.
3GPP TS 36.814 V0.4.1, "Further Advancements for E-UTRA; Physical Layer Aspects," Feb. 2009.
3GPP TS 36.214 V8.6.0, "Evolved Universal Terrestrial Radio Access (E-UTRA) Physical layer—Measurements," Mar. 2009.
3GPP TS 36.213 V8.6.0, "Evolved Universal Terrestrial Radio Access (E-UTRA) Physical layer procedures," Mar. 2009.
3GPP TS 36.212 V8.6.0, "Evolved Universal Terrestrial Radio Access (E-UTRA) Multiplexing and channel coding," Mar. 2009.
3GPP TS 36.211 V8.6.0, "Evolved Universal Terrestrial Radio Access (E-UTRA) Physical Channels and Modulation," Mar. 2009.
Huawei, "RAN2 Considerations for Carrier Aggregation," R2-092180, Mar. 2009.
Motorola, "MAC-Layer Impacts of Bandwidth Aggregation," R2-092357, Mar. 2009.
CMCC, "Discussions on Carrier Aggregation in RAN2," R2-092411, Mar. 2009.
Catt, "Considerations on Carrier Aggregation in RAN2," R2-092991, May 2009.
Ericsson, "Control Plane Aspects of Carrier Aggregation," R2-092958, May 2009.
Ericsson, "Impact of Carrier Aggregation on the L2 Protocol Architecture for LTE Rel-10," R2-092957, May 2009.
Huawei, "Carrier Aggregation in Active Mode," R2-093104, May 2009.
Huawei, "Measurement Report Triggering Asynchronization in CA," R2-093108, May 2009.
Motorola, "Layer-2 Structure for LTE-A Carrier Aggregation," R2-093204, May 2009.
NEC, "Higher Layer Functions to Support Carrier Aggregation," R2-093287, May 2009.
Nokia Siemens Networks, Nokia Corporation, "Idle Mode Mobility in Carrier Aggregation Scenarios," R2-093229, May 2009.
Panasonic, "Synchronization Channel and System Information for Carrier Aggregation," R2-092866, May 2009.
LG Electronics, "Proposals and Issues on the Carrier Aggregation and Control Signaling for LTE-A," R1-084194, Nov. 2008.
LG Electronics, "Considerations on DL/UL Transmission in Asymmetric Carrier Aggregation," R1-084197, Nov. 2008.
CATT, RITT, "Carrier Aggregation for LTE-A," R1-084288, Nov. 2008.
CMCC, "Key Issues in Carrier Aggregation," R1-084332, Nov. 2008.
Huawei, "Carrier Aggregation in LTE-Advanced," R1-084346, Nov. 2008.
Ericsson, "Carrier Aggregation," R1-084374, Nov. 2008.
Qualcomm Europe, "Carrier Aggregation Operation in LTE-Advanced," R1-084397, Nov. 2008.
Texas Instruments, "Issues on Carrier Aggregation for Advanced E-UTRA," R1-084443, Nov. 2008.
Nokia Siemens Networks, Nokia, "Algorithms and Results for Autonomous Component Carrier Selection for LTE-Advanced," R1-084321, Nov. 2008.
Samsung, "Initial Random Access in Asymmetric Carrier Aggregation," R1-090093, Jan. 2009.
CATT, RITT, "Carrier Aggregation for LTE-A," R1-090187, Jan. 2009.
Texas Instruments, "RACH Procedure for Asymmetric Carrier Aggregation," R1-090284, Jan. 2009.
Ericsson, "Control Signaling for Carrier Aggregation," R1-090375, Jan. 2009.
Nortel, "Initial Random Access for Asymmetric Carrier Aggregation," R1-090762, Feb. 2009.
LG Electronics, "Considerations on DL/UL Transmission in Asymmetric Carrier Aggregation," R1-090781, Feb. 2009.
Motorola, "Control Signaling Design for Supporting Carrier Aggregation," R1-090792, Feb. 2009.
Huawei, "Consideration on Carrier Aggregation for Home eNB," R1-090817, Feb. 2009.
Nokia Siemens Networks, Nokia, "Primary Component Carrier Selection, Monitoring, and Recovery," R1-090735, Feb. 2009.
Samsung, "Initial Random Access in Asymmetric Carrier Aggregation," R1-091241, Mar. 2009.
Texas Instruments, "On RACH Procedure for Asymmetric Carrier Aggregation," R1-091298, Mar. 2009.
Motorola, "Initial Random Access Procedure for Asymmetric Carrier Aggregation," R1-091328, Mar. 2009.
Nortel, "Initial Random Access for Asymmetric Carrier Aggregation," R1-091398, Mar. 2009.
3GPP TS 36.304 V8.5.0, "Evolved Universal Terrestrial Radio Access (E-UTRA); User Equipment (UE) Procedures in Idle Mode," Mar. 2009.
Decision to Grant a Patent issued for Japanese Patent Application No. JP 2011-550341 on May 8, 2012.
Huawei, "Carrier Aggregation in Advanced E-UTRA", R1-082448, Jun. 30, 2008.

* cited by examiner

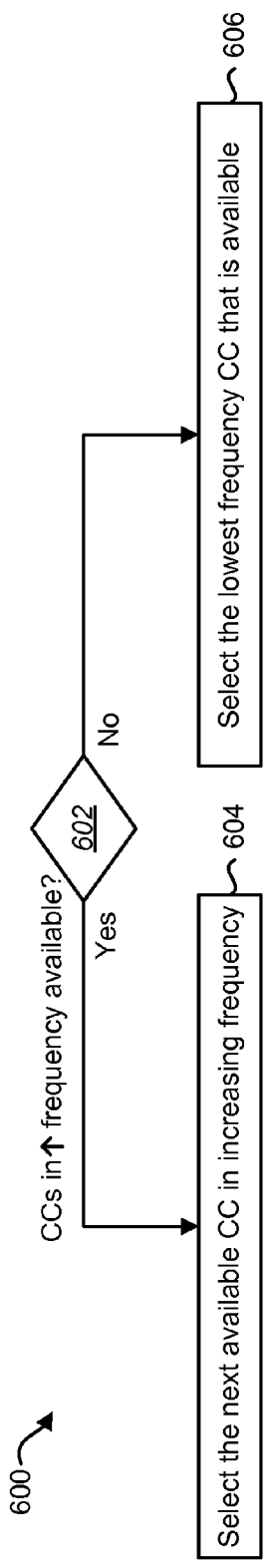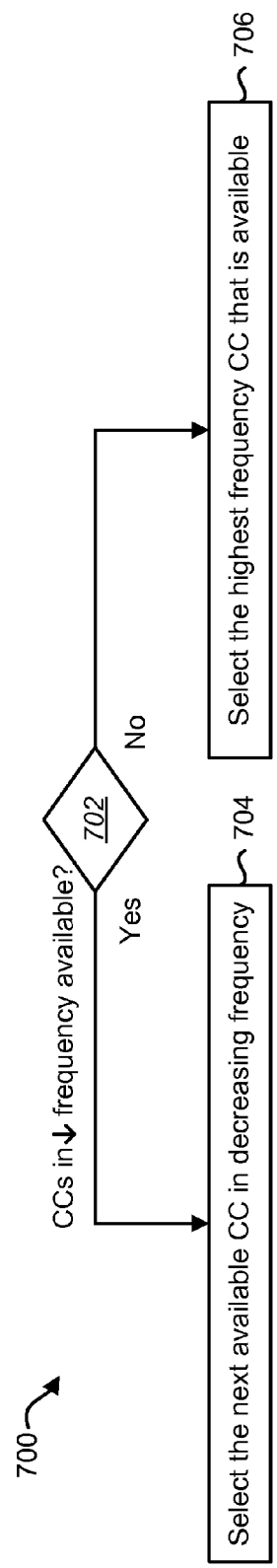

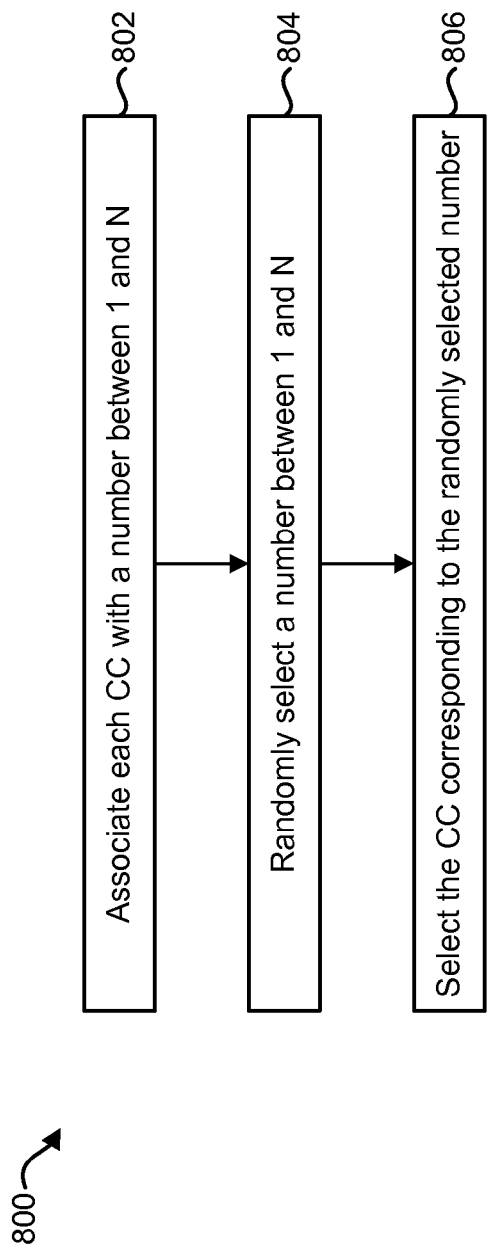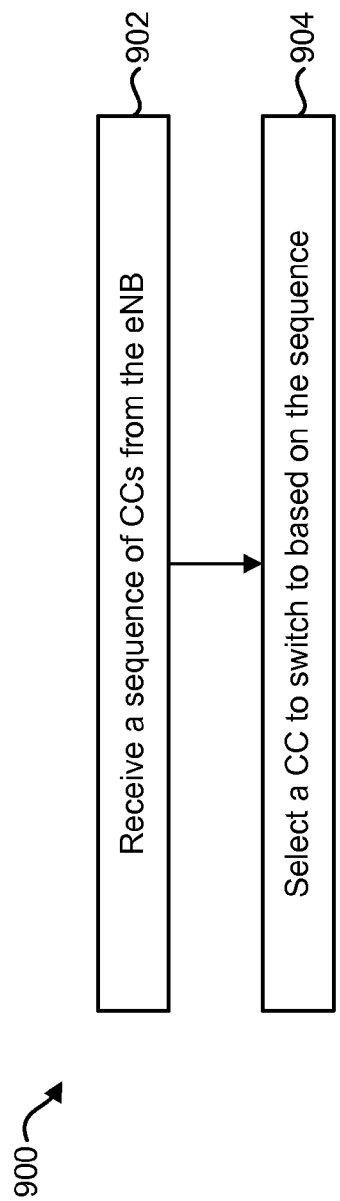

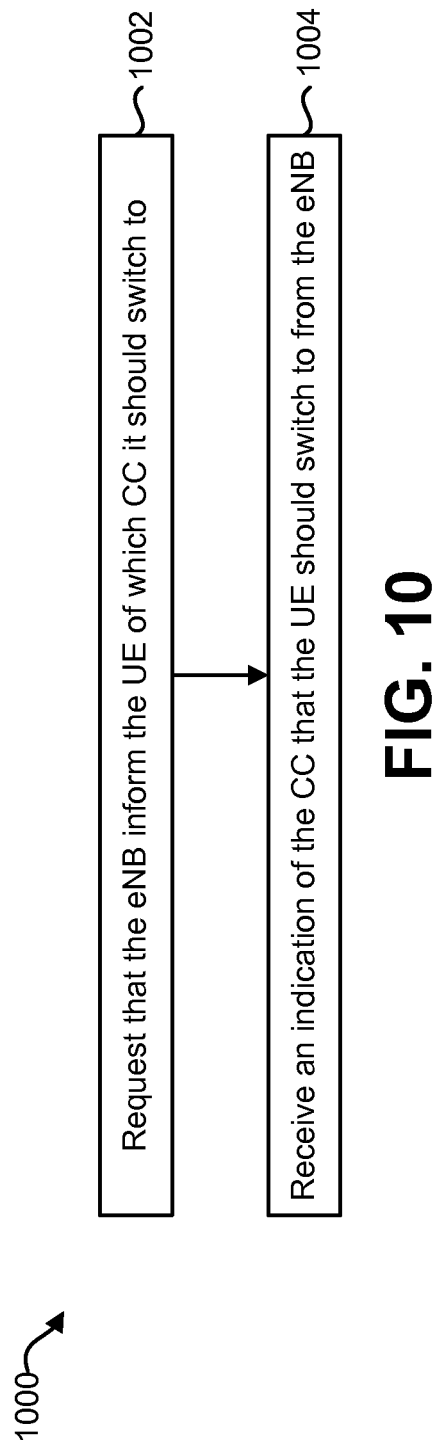
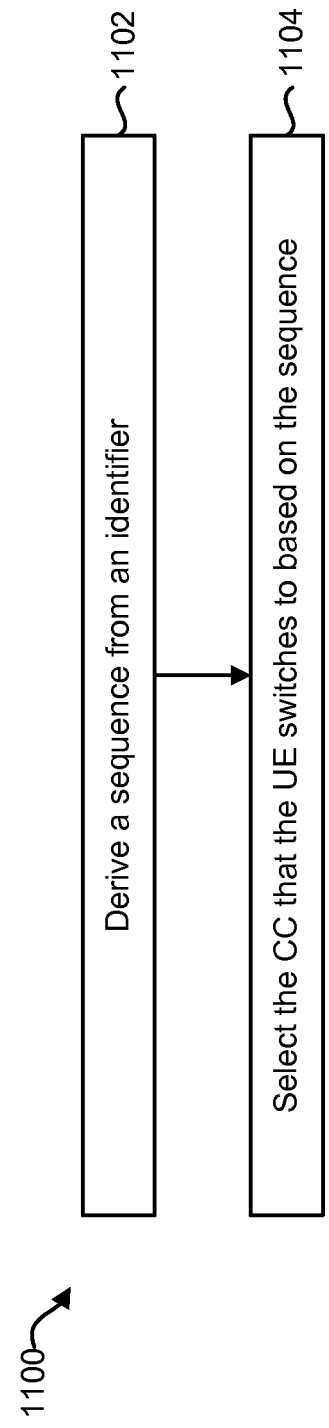
FIG. 10
FIG. 11

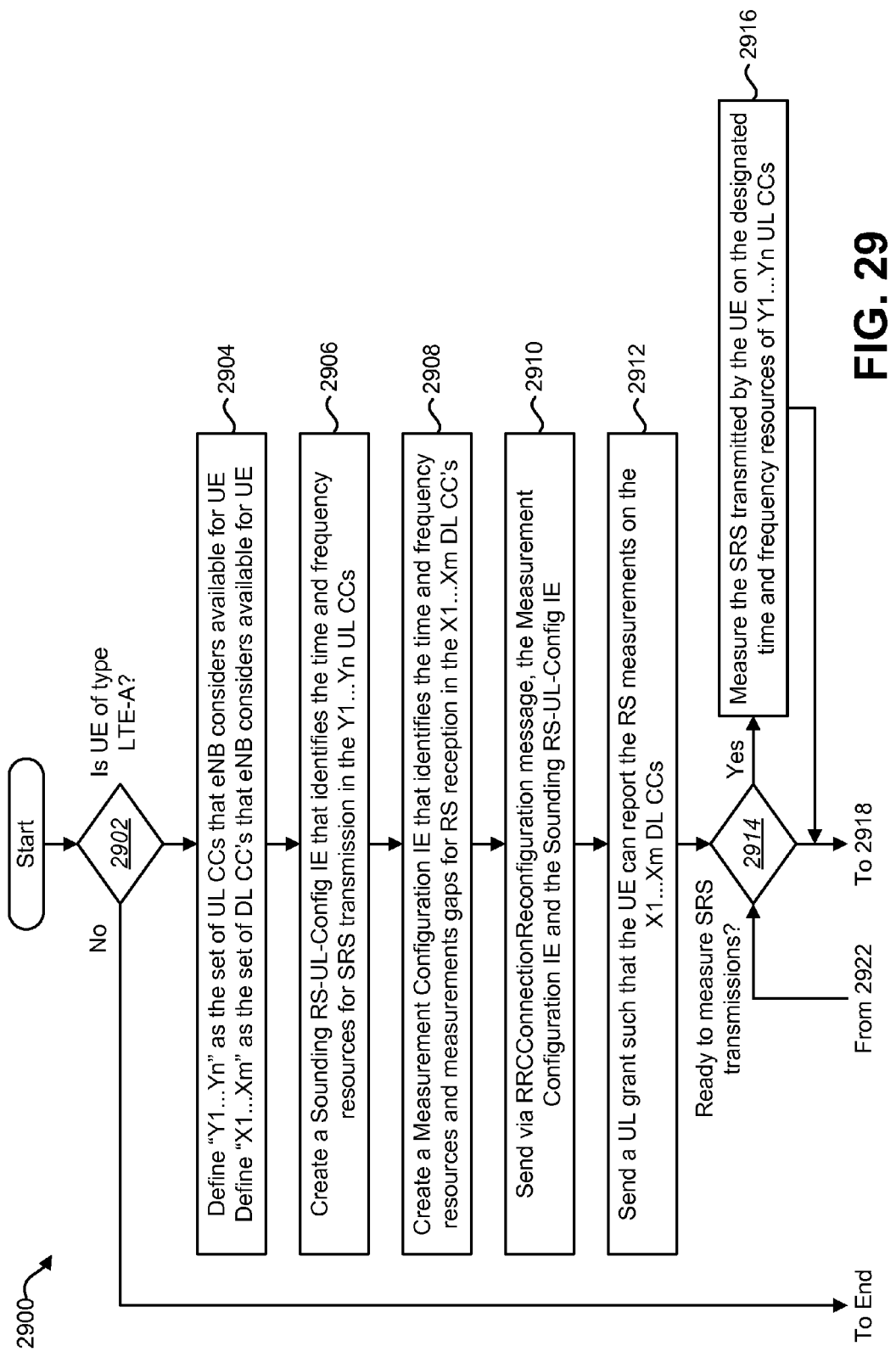

US 9,386,593 B2

SYSTEMS AND METHODS FOR COMPONENT CARRIER SELECTION IN A WIRELESS COMMUNICATION SYSTEM

TECHNICAL FIELD

The present disclosure relates generally to wireless communication systems. More specifically, the present disclosure relates to systems and methods for component carrier selection in a wireless communication system.

BACKGROUND

Wireless communication systems have become an important means by which many people worldwide have come to communicate. A wireless communication system may provide communication for a number of mobile stations, each of which may be serviced by one or more base stations.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems, and devices. In 3GPP specifications, a mobile station is typically referred to as a user equipment (UE), and a base station is typically referred to as a Node B or an evolved Node B (eNB).

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). LTE-Advanced is the next generation of LTE.

3GPP LTE-Advanced specifications will include functionality that will enable separate (possibly non-contiguous) bands of spectrum to be aggregated via partitioning into component carriers. Each component carrier (CC) may include 2.5 MHz to 20 MHz of bandwidth. The reasoning for having a maximum partition of 20 MHz is to provide a mechanism for backward capability to LTE Release 8 and Release 9 UEs. The systems and methods disclosed herein relate generally to component carrier selection in a wireless communication system (e.g., an LTE-Advanced system).

BRIEF DESCRIPTION OF THE DRAWINGS

FIG. 6 illustrates a method for selecting a component carrier for a UE to switch to;

FIG. 7 illustrates another method for selecting a component carrier for a UE to switch to;

FIG. 8 illustrates another method for selecting a component carrier for a UE to switch to;

FIG. 9 illustrates another method for selecting a component carrier for a UE to switch to;

FIG. 10 illustrates another method for selecting a component carrier for a UE to switch to;

FIG. 11 illustrates another method for selecting a component carrier for a UE to switch to;

FIG. 14 illustrates another method for selecting a component carrier for a UE to switch to;

FIG. 15 illustrates another method for selecting a component carrier for a UE to switch to;

FIG. 16 illustrates a method for selecting an eNB for a UE to switch to;

DETAILED DESCRIPTION

Figure 1:
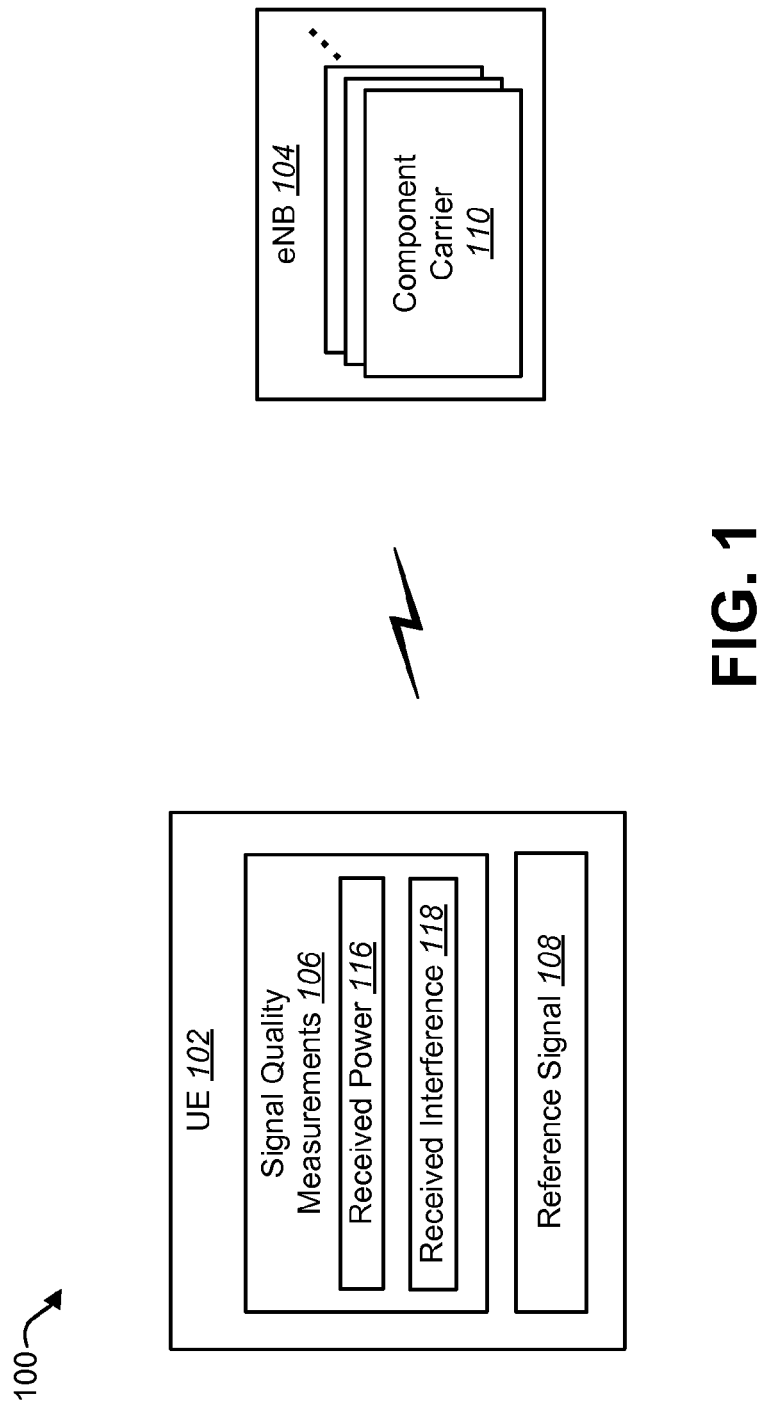
FIG. 1 illustrates a wireless communication system in which at least some of the methods disclosed herein may be implemented.

For clarity, the systems and methods disclosed herein will be described using terminology from the 3GPP LTE and LTE-Advanced standards. However, the scope of the present disclosure should not be limited in this regard. The systems and methods disclosed herein may be utilized in other types of wireless communication systems.

As indicated above, the systems and methods disclosed herein relate generally to component carrier (CC) selection in a wireless communication system (e.g., an LTE-Advanced system). Initially, systems and methods will be described that relate to CC selection for a UE that is in idle mode.

An LTE Release 8 UE in idle mode will attempt to reselect to another eNB when it detects via downlink (DL) signaling measurements that the power of the reference signal (RS) has dropped below a threshold. In LTE Release 8, the level of interference that a UE perceives on a data channel is so closely related to RS power, that factoring interference into the reselection algorithm is not necessary. In an LTE-Advanced system, there are new sources of interference such that relying on a strong relationship between RS power and interference is no longer valid. Therefore, the factoring of an interference measurement into the UE reselection algorithm may be beneficial. In an LTE-Advanced system, it is possible for a UE to monitor in idle mode any one of up to 5 CCs (i.e., camp on the CCs). Thus when a UE that is camped on CC[1] detects interference, it does not necessarily mean that the same interferer is affecting CC[n]. Therefore, it is not necessarily desirable to trigger a reselection on the condition of ((RS_Power<Threshold_Power)||
(Interference>Threshold_Interference)).

A method for component carrier (CC) selection is disclosed. A user equipment (UE) that is in idle mode receives a reference signal (RS) from an evolved Node B (eNB). The UE obtains signal quality measurements with respect to the RS. The UE switches to a new CC based on the signal quality measurements. The signal quality measurements may include received power and interference.

The UE may switch to a new CC if the received power is not less than a received power threshold, if the received interference exceeds an interference threshold, and if the eNB has at least one other CC available. Alternatively, the UE may switch to a new CC if the received power does not drop below a received power threshold, if the UE cannot decode data packets sent by the eNB, and if the eNB has at least one other CC available. The UE may signal the eNB when the UE successfully switches to the new CC.

To select the CC that the UE switches to, the UE may select the next available CC in increasing frequency, or if there are not any available CCs in increasing frequency, the UE may select the lowest frequency CC that is available. Alternatively, the UE may select the next available CC in decreasing frequency, or if there are not any available CCs in decreasing frequency, the UE may select the highest frequency CC that is available. As another alternative, the UE may select the CC that the UE switches to by a random selection of a number between 1 and N, where N is the total number of available CCs.

As another alternative, the UE may select the CC that the UE switches to by a sequence of CCs that is signaled by the eNB to the UE. As another alternative, the UE may select the CC that the UE switches to by requesting that the eNB inform the UE of which CC it should switch to, and receiving an indication of the CC that the UE should switch to from the eNB. As another alternative, the UE may select the CC that the UE switches to by a sequence of CCs that is derived from a cell identifier, a UE identifier, etc.

As another alternative, the UE may select the CC that the UE switches to by obtaining signal quality measurements with respect to other available CCs, applying weighted values to results of the signal quality measurements, and applying selection criteria to the weighted results.

As another alternative, the UE may select the CC that the UE switches to by obtaining signal quality measurements with respect to other available CCs, and generating rankings for the other available CCs based on the signal quality measurements and offsets for the CCs. The UE may determine that an offset for a particular CC has been adjusted by the eNB based on offsets for adjacent CCs. Alternatively, the UE may determine that an offset for a particular CC has been adjusted by the eNB based on transmit power of the CC. As another alternative, the UE may determine that an offset for a particular CC has been adjusted by the eNB based on interference levels of other CCs. The rankings may also be generated based on offsets between CCs.

The UE may select the other available CCs for which the signal quality measurements are obtained and the rankings are generated based on a cell-specific identifier. Alternatively, the UE may select the other available CCs for which the signal quality measurements are obtained and the rankings are generated based on a UE-specific identifier.

The UE may obtain signal quality measurements with respect to other eNBs. The signal quality measurements may include received power and received interference. The UE may generate rankings for the other eNBs based on the received power. The UE may apply offsets to the received power for a particular eNB before the ranking is generated if the received interference for that eNB exceeds a threshold.

The UE may switch to another eNB if the UE makes m unsuccessful attempts to switch to a new CC in a defined time period. As another alternative, the UE may switch to another eNB if the UE makes m sequential unsuccessful attempts to switch to a new CC.

A user equipment (UE) that is configured for component carrier (CC) selection while in idle mode is also disclosed. The UE includes a processor, memory in electronic communication with the processor, and instructions stored in the memory. The instructions are executable to receive a reference signal (RS) from an evolved Node B (eNB), obtain signal quality measurements with respect to the RS, and switch to a new CC based on the signal quality measurements.

FIG. 1 illustrates a wireless communication system 100 that includes a UE 102 and an eNB 104. The UE 102 is an electronic device that may be used for voice and/or data communication over a wireless communication network, such as a cellular network. The UE 102 may be a cellular phone, a smart phone, a personal digital assistant (PDA), a card in a laptop or personal computer, etc. The eNB 104 facilitates wireless communication between the UE 102 and a network. The eNB 104 is a fixed station that contains radio frequency transmitters and receivers that are used to communicate with UEs, which may move freely around the eNB 104. Signals that are transmitted from the UE 102 to the eNB 104 are referred to as uplink signals, and signals that are transmitted from the eNB 104 to the UE 102 are referred to as downlink signals.

The UE 102 and the eNB 104 may be configured to operate in accordance with an LTE-Advanced standard. The total amount of bandwidth that is allocated to the eNB 104 may be partitioned into separate CCs 110. Wireless electronic communication may occur between the UE 102 and the eNB 104 via one of the available CCs 110. Other items shown in FIG. 1 will be discussed below in connection with the method shown in FIG. 2.

Figure 2:
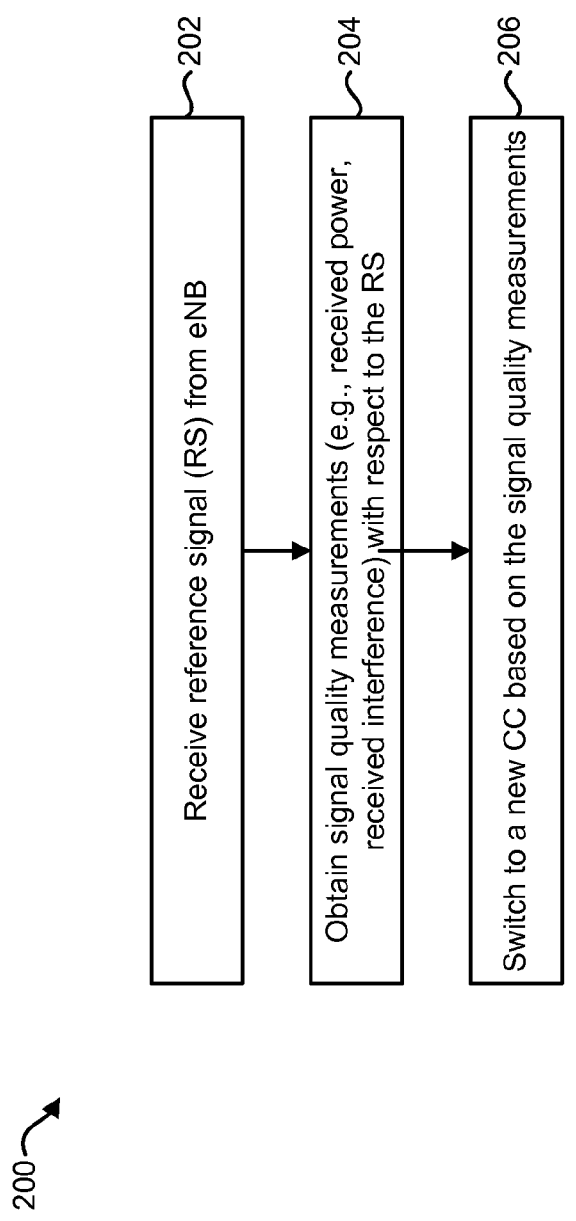
FIG. 2 illustrates a method for component carrier selection in the wireless communication system of FIG. 1.

FIG. 2 illustrates a method 200 for CC selection in a wireless communication system 100. The method 200 may be implemented when the UE 102 is in idle mode. A UE 102 may receive 202 a reference signal (RS) 108 from an eNB 104 via a particular CC 110, which may be referred to herein as the "current" CC 110. The UE 102 may obtain 204 signal quality measurements 106 with respect to the RS 108. The signal quality measurements 106 may provide information about the signal quality of the current CC 110. The signal quality measurements 106 may include received power 116 and received interference 118. The UE 102 may switch 206 to a new CC 110 based on the signal quality measurements 106. For example, if the signal quality measurements 106 indicate that the received power 116 of the current CC 110 is acceptable, but the interference 118 of the current CC 110 is too high, and there is at least one other CC 110 available that may provide adequate power 116 but less interference 118, then the UE 102 may switch 206 to the other CC 110. In this context, "switch" means that the UE 102 re-tunes and monitors another CC 110 of the current eNB 104.

Figure 3:
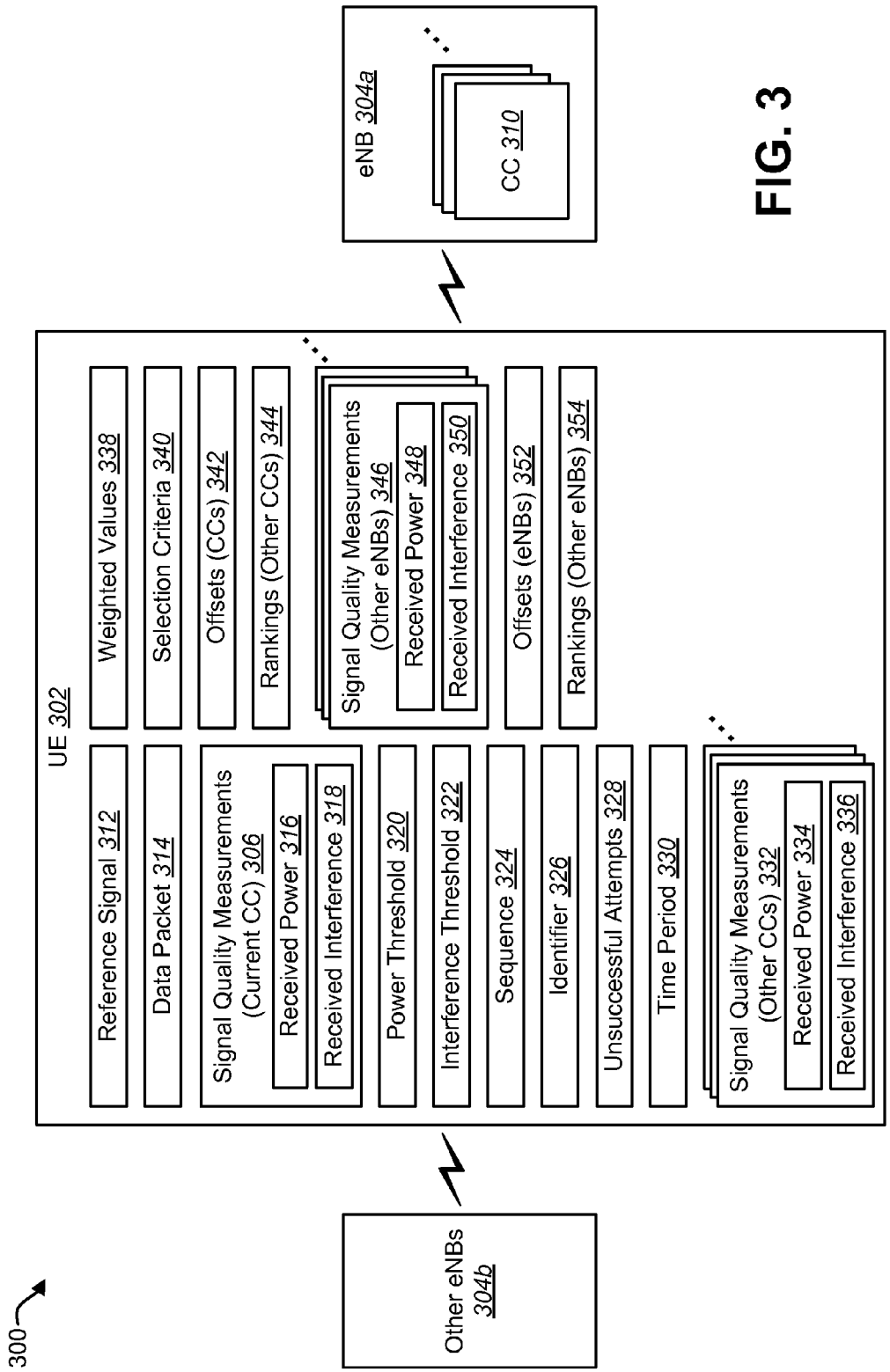
FIG. 3 illustrates a wireless communication system in which at least some of the methods disclosed herein may be implemented.

FIG. 3 illustrates a wireless communication system 300 that includes a UE 302, an eNB 304a, and one or more other eNBs 304b. The UE 302 and the eNB 304a may be configured to operate in accordance with an LTE-Advanced standard, and wireless electronic communication may occur between the UE 302 and the eNB 304a via one of multiple CCs 310. Other items shown in FIG. 3 will be discussed below in connection with the methods shown in FIGS. 4-16.

Figure 4:
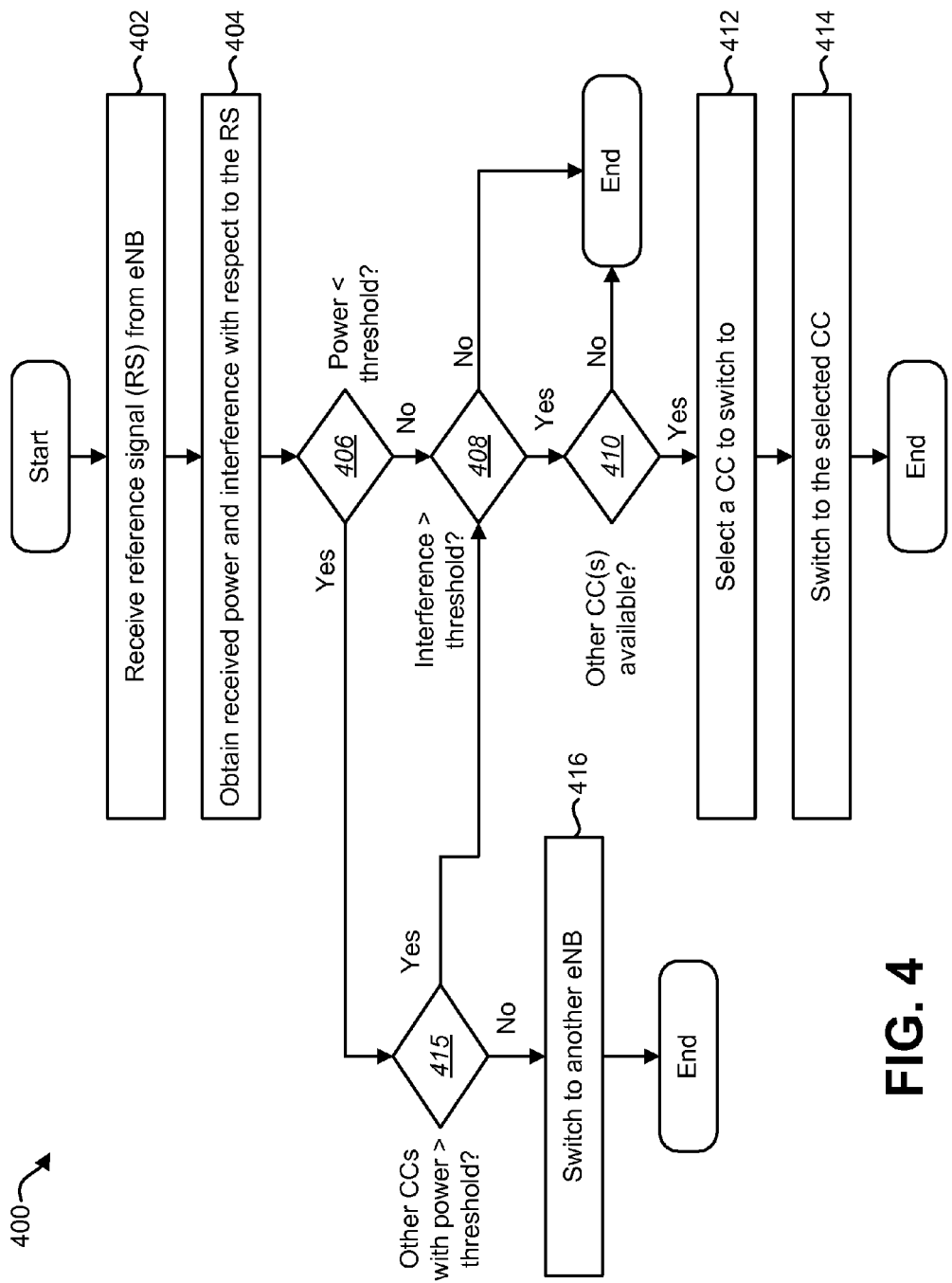
FIG. 4 illustrates a method for component carrier selection in the wireless communication system of FIG. 3.

FIG. 4 illustrates a method 400 for CC selection in a wireless communication system 300. The method 400 may be implemented when the UE 302 is in idle mode. A UE 302 may receive 402 a reference signal (RS) 312 from an eNB 304a via a particular CC 310, which may be referred to herein as the "current" CC 310. The UE 302 may obtain 404 signal quality measurements 306 with respect to the RS 312. The signal quality measurements 306 may include received power 316 and received interference 318 with respect to the RS 312.

A measure of interference in an LTE-Advanced system may originate from one of the following sources: RSSI (Reference Signal Strength Indicator), RSRQ (Reference Signal Received Quality), CQU (Channel Quality Indicator), or a custom RS. An additional load based metric might be signaled by the network to the UE 302 in order to improve the RSRQ estimates (i.e., load==amount of data traffic carried by the eNB 304a).

The UE 302 may determine 406 whether the received power 316 is less than a defined threshold 320, which may be referred to herein as a power threshold 320. If the received power 316 is not less than the power threshold 320, then the UE 302 may determine 408 whether the received interference 318 exceeds a threshold 322, which may be referred to herein as an interference threshold 322. If the received interference 318 does not exceed the interference threshold 322, then the method 400 may end.

If the received interference 318 exceeds the interference threshold 322, then the UE 302 may determine 410 whether there is at least one other CC 310 available via which the UE 302 may communicate with the eNB 304a. If not, then the method 300 may end. However, if there is at least one other available CC 310, then the UE 302 may select 412 a CC 310 to switch to, and the UE 302 may switch 414 to the selected CC 310.

If the UE 302 determines 406 that the received power 316 is less than the power threshold 320, then the UE 302 may determine 415 whether there are any CCs 310 on this eNB 304a that have an RS power that is greater than the power threshold 320. If so, then the method 400 may proceed to decision block 408 and continue in the manner described above. If the UE 302 determines 415 that there are not any CCs 310 on this eNB 304a that have an RS power that is greater than the power threshold 320, then the UE 302 may switch 416 to another eNB 304b.

Figure 5:
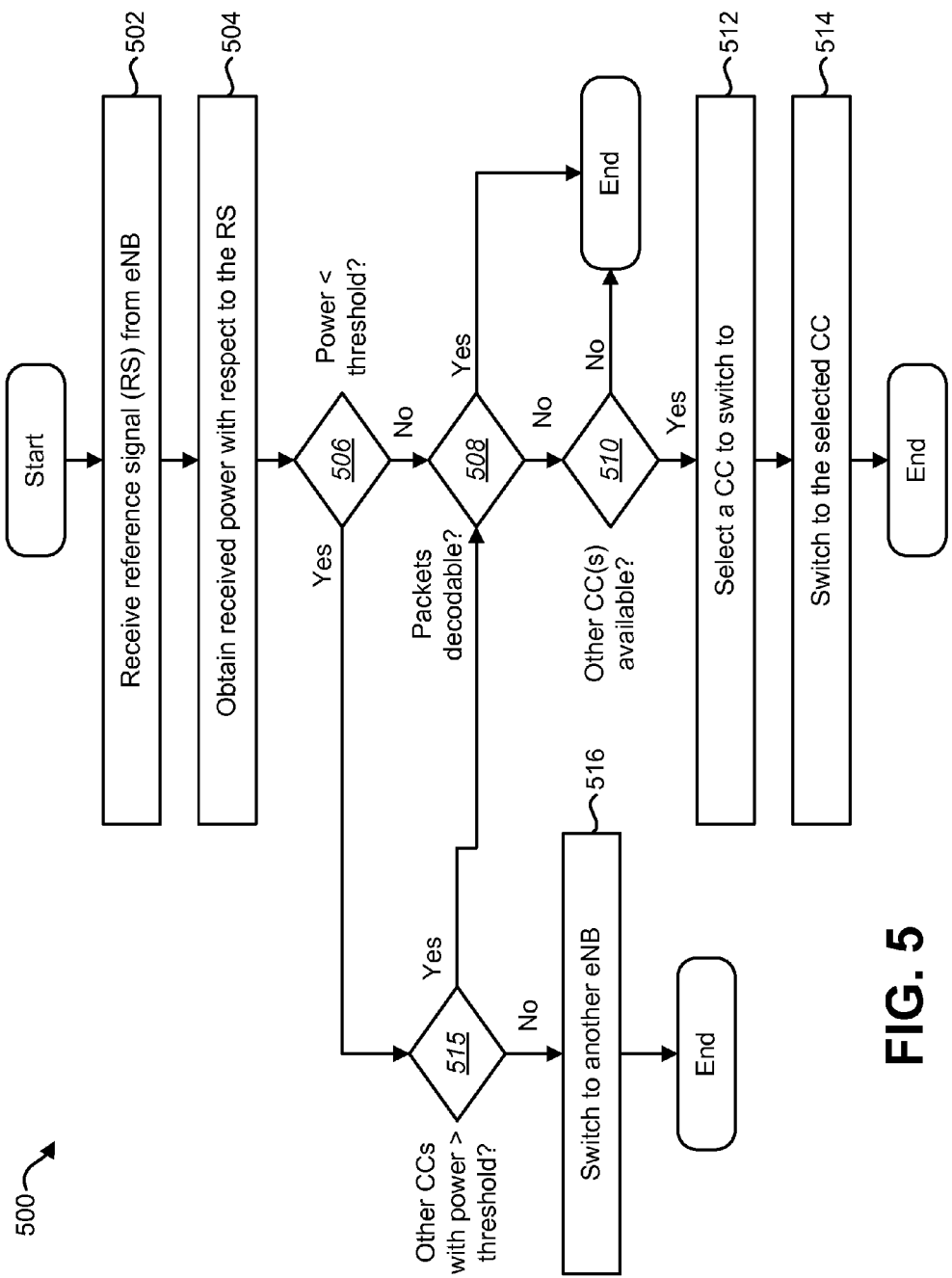
FIG. 5 illustrates another method for component carrier selection in the wireless communication system of FIG. 3.

FIG. 5 illustrates another method 500 for CC selection in a wireless communication system 300. The method 500 may be implemented when the UE 302 is in idle mode. A UE 302 may receive 502 a reference signal (RS) 312 from an eNB 304a via a particular CC 310, which may be referred to herein as the "current" CC 310. The UE 302 may obtain 504 the received power 316 with respect to the RS 312. The UE 302 may determine 506 whether the received power 316 is less than the power threshold 320.

If the received power 316 is not less than the power threshold 320, then the UE 302 may attempt 508 to decode data packets 314 received from the eNB 304a. The data packets 314 may be broadcasted by the eNB 304a via the PDCCH, PBCH, etc. If the data packets 314 are decodable, then the method 500 may end. If the data packets 314 are not decodable, then the UE 302 may determine 510 whether there is at least one other CC 310 available via which the UE 302 may communicate with the eNB 304a. If not, then the method 500 may end. However, if there is at least one other available CC 310, then the UE 302 may select 512 a CC 310 to switch to, and the UE 302 may switch 514 to the selected CC 310.

If the UE 302 determines 506 that the received power 316 is less than the power threshold 320, then the UE 302 may determine 515 whether there are any CCs 310 on this eNB 304a that have an RS power that is greater than the power threshold 320. If so, then the method 500 may proceed to decision block 508, and continue in the manner described above. If the UE 302 determines 515 that there are not any CCs 310 on this eNB 304a that have an RS power that is greater than the power threshold 320, then the UE 302 may switch 516 to another eNB 304b.

The methods shown in FIGS. 4 and 5 both involve selecting 412, 512 a CC 310 for the UE 302 to switch to. There are many ways that this may be accomplished.

FIG. 6 illustrates a method 600 for selecting 412, 512 a CC 310 for the UE 302 to switch to. The UE 302 may determine 602 whether there are any CCs 310 in increasing frequency (relative to the current CC 310) that are available. If so, then the UE 302 may select 604 the next available CC 310 in increasing frequency. Otherwise, the UE 302 may select 606 the lowest frequency CC 310 (other than the current CC 310) that is available.

FIG. 7 illustrates another method 700 for selecting 412, 512 a CC 310 for the UE 302 to switch to. The UE 302 may determine 702 whether there are any CCs 310 in decreasing frequency (relative to the current CC 310) that are available. If so, then the UE 302 may select 704 the next available CC 310 in decreasing frequency. Otherwise, the UE 302 may select 706 the highest frequency CC 310 (other than the current CC 310) that is available.

FIG. 8 illustrates another method 800 for selecting 412, 512 a CC 310 for the UE 302 to switch to. The UE 302 may associate 802 each of N available CCs 310 with a number between 1 and N, so that each available CC 310 is associated with a different number. The UE 302 may randomly select 804 a number between 1 and N. The UE 302 may then select 806 the CC 310 that corresponds to the randomly selected number. If the result of the random number selection maps to the currently used CC 310, then the random number selection process is repeated until a number is selected that does not map to the currently used CC 310.

FIG. 9 illustrates another method 900 for selecting 412, 512 a CC 310 for the UE 302 to switch to. The UE 302 may receive 902 a sequence 324 of CCs 310 from the eNB 304a. The sequence 324 may specify which CC 310 is to be selected after the current CC 310. The UE 302 may select 904 a CC 310 to switch to based on the sequence 324.

FIG. 10 illustrates another method 1000 for selecting 412, 512 a CC 310 for the UE 302 to switch to. The UE 302 may request 1002 that the eNB 304a inform the UE 302 of which CC 310 it should switch to. In response, the UE 302 may receive 1004 from the eNB 304a an indication of the CC 310 that the UE 302 should switch to.

FIG. 11 illustrates another method 1100 for selecting 412, 512 a CC 310 for the UE 302 to switch to. The UE 302 may derive 1102 a sequence 324 from an identifier 326. The identifier 326 may be a cell identifier, a UE identifier, etc. The UE 302 may select 1104 the CC 310 that the UE 302 switches to based on the derived sequence 324.

Figure 12:
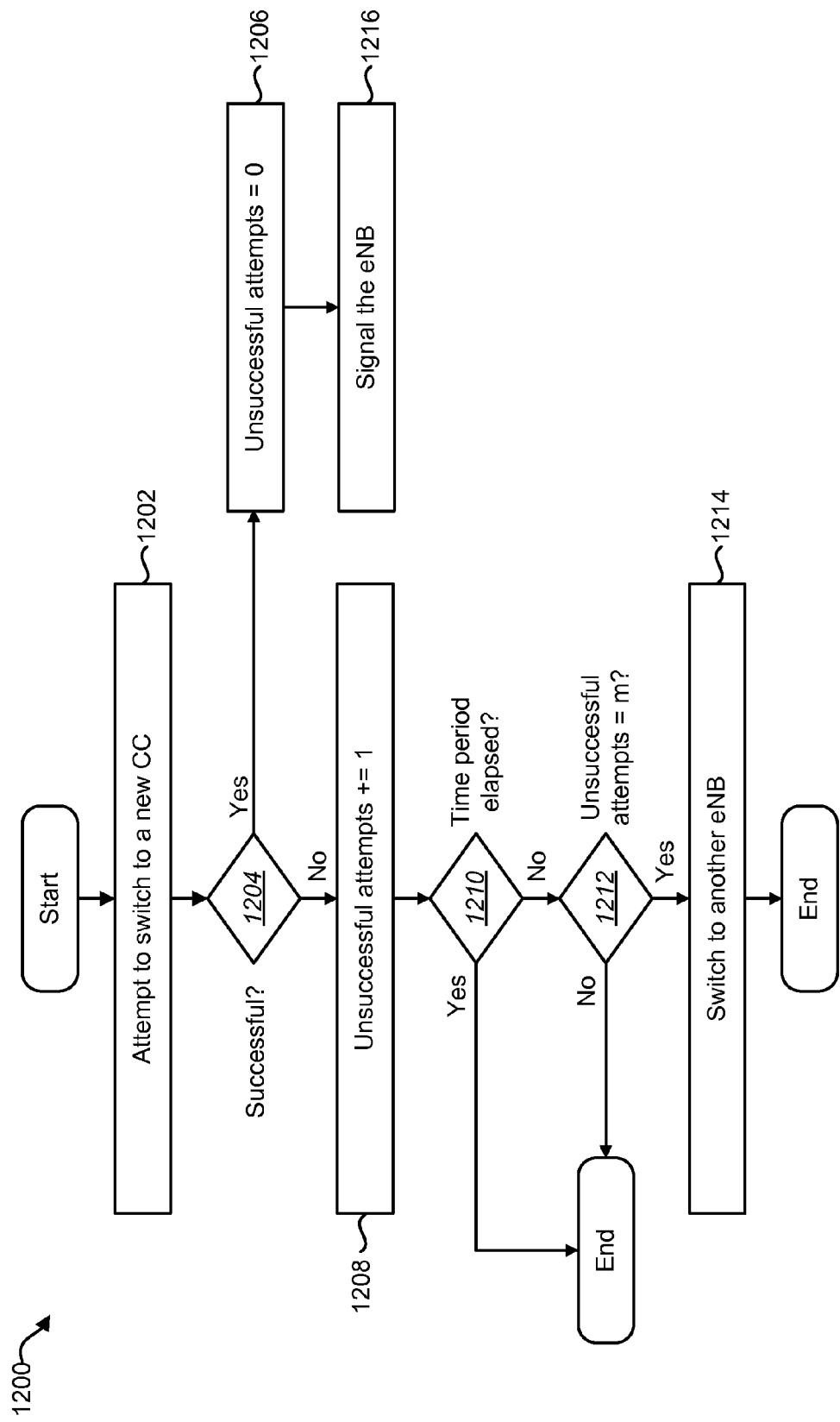
FIG. 12 illustrates a method that may be performed by a UE in connection with attempting to switch to another component carrier.

As discussed above in connection with the methods shown in FIGS. 4 and 5, under some circumstances the UE 302 may switch 414, 514 to another CC 310. FIG. 12 illustrates a method 1200 that may be performed by the UE 302 in connection with attempting to switch 414, 514 to another CC 310.

In the depicted method 1200, the UE 302 may attempt 1202 to switch to another CC 310. If the UE 302 determines 1204 that it has successfully switched to another CC 310, then the UE 302 may reset 1206 a variable 328 (which may be referred to herein as an unsuccessful attempts variable 328) to zero. The UE 302 may also signal 1216 the eNB 304a to inform the eNB 304a that the UE 302 has successfully switched to another CC 310. However, if the UE 302 determines 1204 that it has not successfully switched to another CC 310, then the UE 302 may increment 1208 the unsuccessful attempts variable 328.

The UE 302 may also determine 1210 whether a defined time period 330 has elapsed. If the time period 330 has elapsed, then the method 1200 may end. However, if the time period 330 has not elapsed, then the UE 302 may determine 1212 whether the unsuccessful attempts variable 328 equals a defined value, which may be referred to herein as "m". (The time period 330 and the value of m are configurable and may be signaled to the UE 302 by the eNB 304a.) If it is determined 1212 that the unsuccessful attempts variable 328 does not equal m, then the method 1200 may end. However, if it is determined 1212 that the unsuccessful attempts variable 328 equals m, then the UE 302 may switch 1214 to another eNB 304b.

Figure 13:
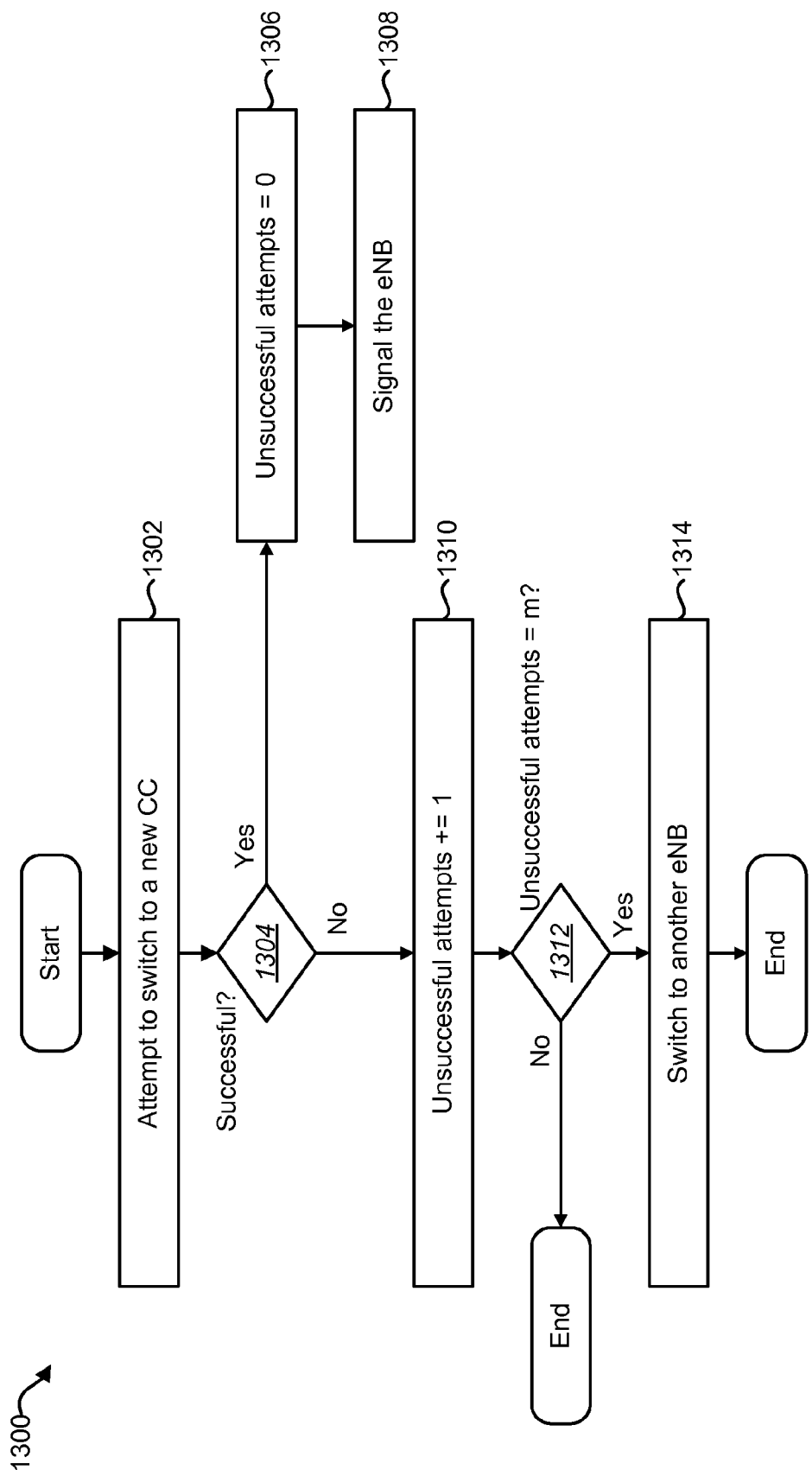
FIG. 13 illustrates another method that may be performed by a UE in connection with attempting to switch to another component carrier.

FIG. 13 illustrates another method 1300 that may be performed by the UE 302 in connection with attempting to switch 414, 514 to another CC 310. In the depicted method 1300, the UE 302 may attempt 1302 to switch to another CC 310. If the UE 302 determines 1304 that it has successfully switched to another CC 310, then the UE 302 may reset 1306 the unsuccessful attempts variable 328 to zero, and signal 1308 the eNB 304a to inform the eNB 304a that the UE 302 has successfully switched to another CC 310.

However, if the UE 302 determines 1304 that it has not successfully switched to another CC 310, then the UE 302 may increment 1310 the unsuccessful attempts variable 328. The UE 302 may then determine 1312 whether the unsuccessful attempts variable 328 equals a defined value (m). If it is determined 1312 that the unsuccessful attempts variable 328 does not equal m, then the method 1300 may end. However, if it is determined 1312 that the unsuccessful attempts variable 328 equals m, then the UE 302 may switch 1314 to another eNB 304b.

Figure 14:
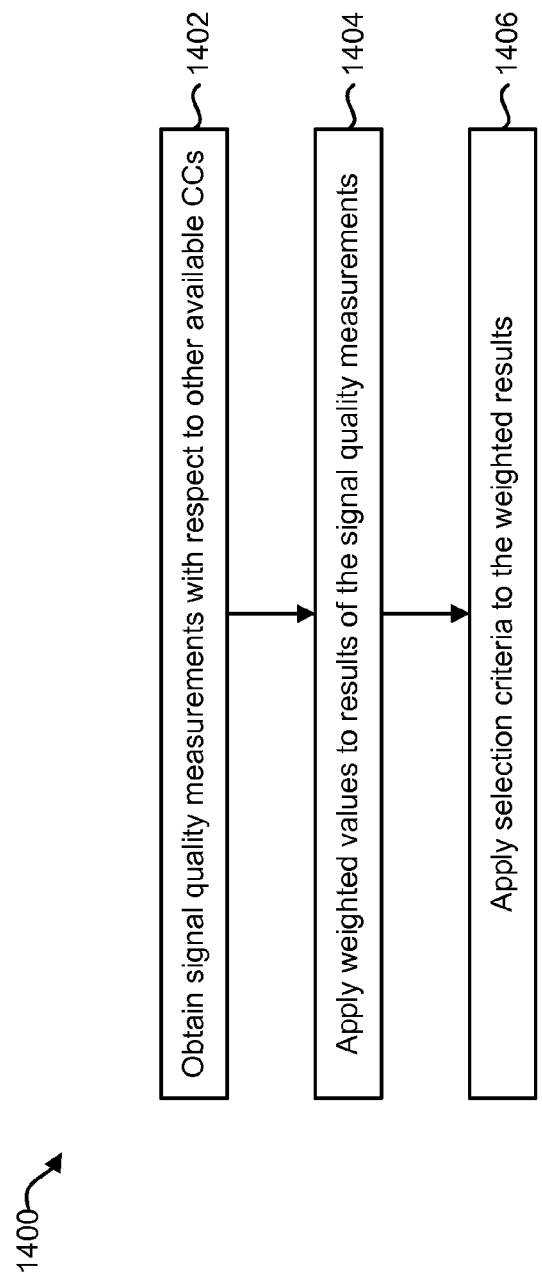

FIG. 14 illustrates another method 1400 for selecting 412, 512 a CC 310 for the UE 302 to switch to. A UE 302 may obtain 1402 signal quality measurements 332 with respect to other available CCs 310. The signal quality measurements 332 may include received power 334 and received interference 336. The UE 302 may apply 1404 weighted values 338 to results of the signal quality measurements 332. The weighted values 338 may have been supplied by the eNB 304a, such that each weighted value 338 is associated with a specific CC's received power 334 or received interference 336 value. The UE 302 may also apply 1406 selection criteria 340 to the weighted results. The selection criteria 340 for the best CC 310 could be the best received power 334, the lowest received interference 336, or a combination thereof.

Figure 15:
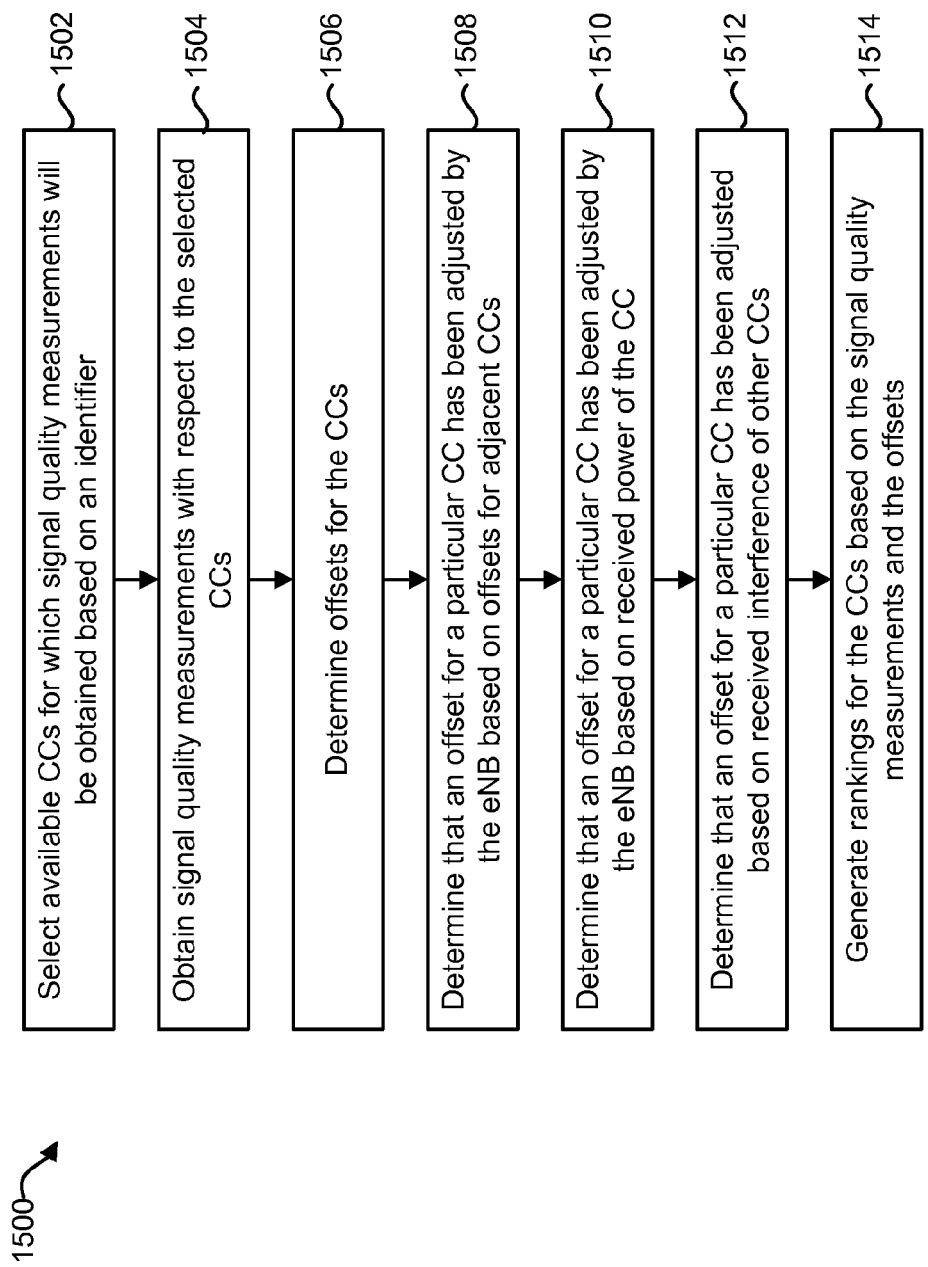

FIG. 15 illustrates another method 1500 for selecting 412, 512 a CC 310 for the UE 302 to switch to. The UE 302 may select 1502 available CCs 310 for which signal quality measurements 332 will be obtained based on an identifier 326. The identifier 326 may be cell-specific, UE-specific, etc. The UE 302 may obtain 1504 signal quality measurements 332 with respect to the selected CCs 310. The UE 302 may determine 1506 offsets 342 (e.g., Qoffsets) for the CCs 310. The UE 302 may determine 1508 that an offset 342 for a particular CC 310 has been adjusted by the eNB 304a based on offsets 342 for adjacent CCs 310. The UE 302 may determine 1510 that an offset 342 for a particular CC 310 has been adjusted by the eNB 304a based on received power 334 of the CC 310. The UE 302 may determine 1512 that an offset 342 for a particular CC 310 has been adjusted by the eNB 304a based on received interference 336 of other CCs 310. Under some circumstances, an offset 342 between CCs 310 may be used (e.g., Qoffsetcomponent). An offset 342 between CCs 310 may be a modification of the current Qoffsetfrequency defined in the specifications or a new offset defined just for CCs 310. The UE 302 may generate 1514 rankings 344 for the CCs 310 based on the signal quality measurements 332 and the offsets 342.

Figure 16:
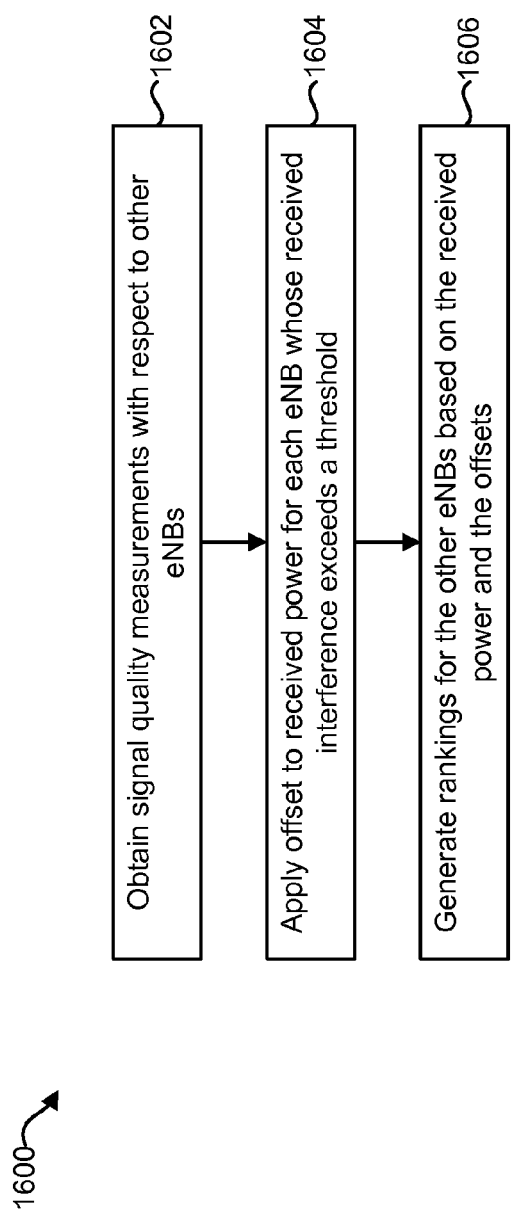

In the methods shown in FIGS. 4 and 5, the UE 302 may switch 416, 516 to another eNB 304b under some circumstances. FIG. 16 illustrates a method 1600 for selecting the eNB 304b that the UE 302 should switch to. The method 1600 may be performed if the current eNB 304a is configured for operation in accordance with LTE-Advanced or LTE.

The UE 302 may obtain 1602 signal quality measurements 346 with respect to other eNBs 304b. The signal quality measurements 346 may include received power 348 and received interference 350. The UE 302 may apply 1604 an offset 352 (e.g., Qoffset) to the received power 348 for each eNB 304b whose received interference 350 exceeds the interference threshold 322. The magnitude of the offset 352 may be related to the level of interference 350. The UE 302 may generate 1606 rankings 354 for the other eNBs 304b based on the received power 348 and the offsets 352.

Figure 17:
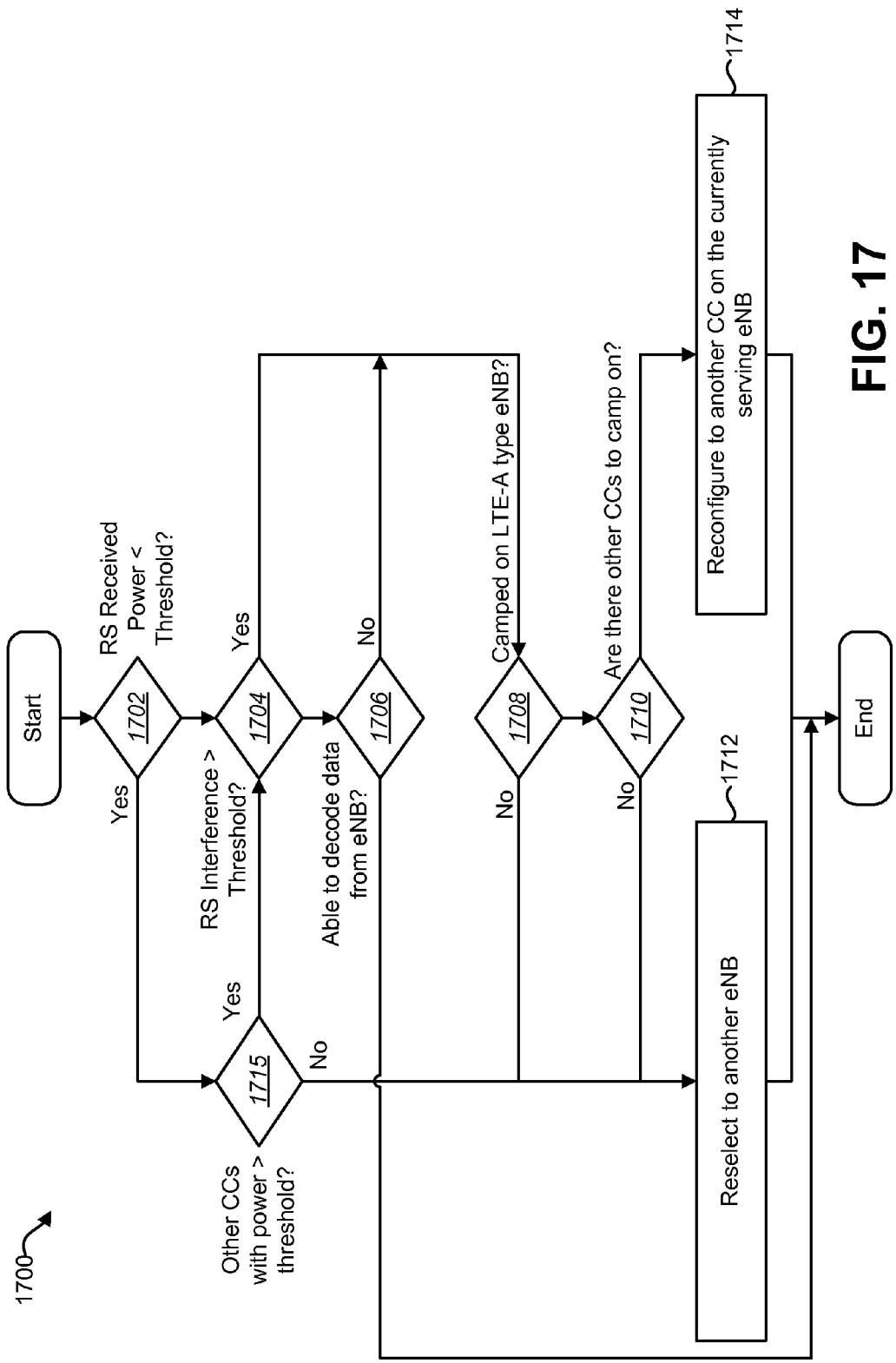
FIG. 17 illustrates a method that may be implemented in a UE in order to determine reselection to another eNB or reconfiguration to another component carrier.

FIG. 17 illustrates a method 1700 that may be implemented in a UE in order to determine reselection to another eNB or reconfiguration to another CC. In the method 1700, a UE may determine 1702 whether the received power of a reference signal is less than a defined power threshold. If the received power of the reference signal is not less than the defined power threshold, then the UE may determine 1704 whether the interference of the reference signal is greater than a defined interference threshold. If it is, then the UE may determine 1708 whether it is currently camped on an LTE-Advanced type eNB. If it is, then the UE may determine 1710 whether there are other available CCs to camp on. If there are, then the UE may reconfigure 1714 to another CC on the currently serving eNB. If the UE determines 1708 that it is not camped on an LTE-Advanced type eNB, or if the UE determines 1710 that there are not any other CCs to camp on, then the UE may reselect 1712 to another eNB.

If the UE determines 1704 that the interference of the reference signal is not greater than the defined interference threshold, then the UE may determine 1706 whether it is able to successfully decode data received from the currently serving eNB. If it can, then the method may end. If it cannot, then the UE may determine 1708 whether the UE is camped on an LTE-Advanced type eNB, and then continue in the manner described above.

If the UE determines 1702 that the received power of the reference signal is less than the defined power threshold, then the UE may determine 1715 whether there are any CCs on this eNB that have an RS power that is greater than the power threshold. If so, then the method 1700 may proceed to decision block 1704 and continue in the manner described above. If the UE determines 1715 that there are not any CCs on this eNB that have an RS power that is greater than the power threshold, then the UE may reselect 1712 to another eNB.

Figure 18:
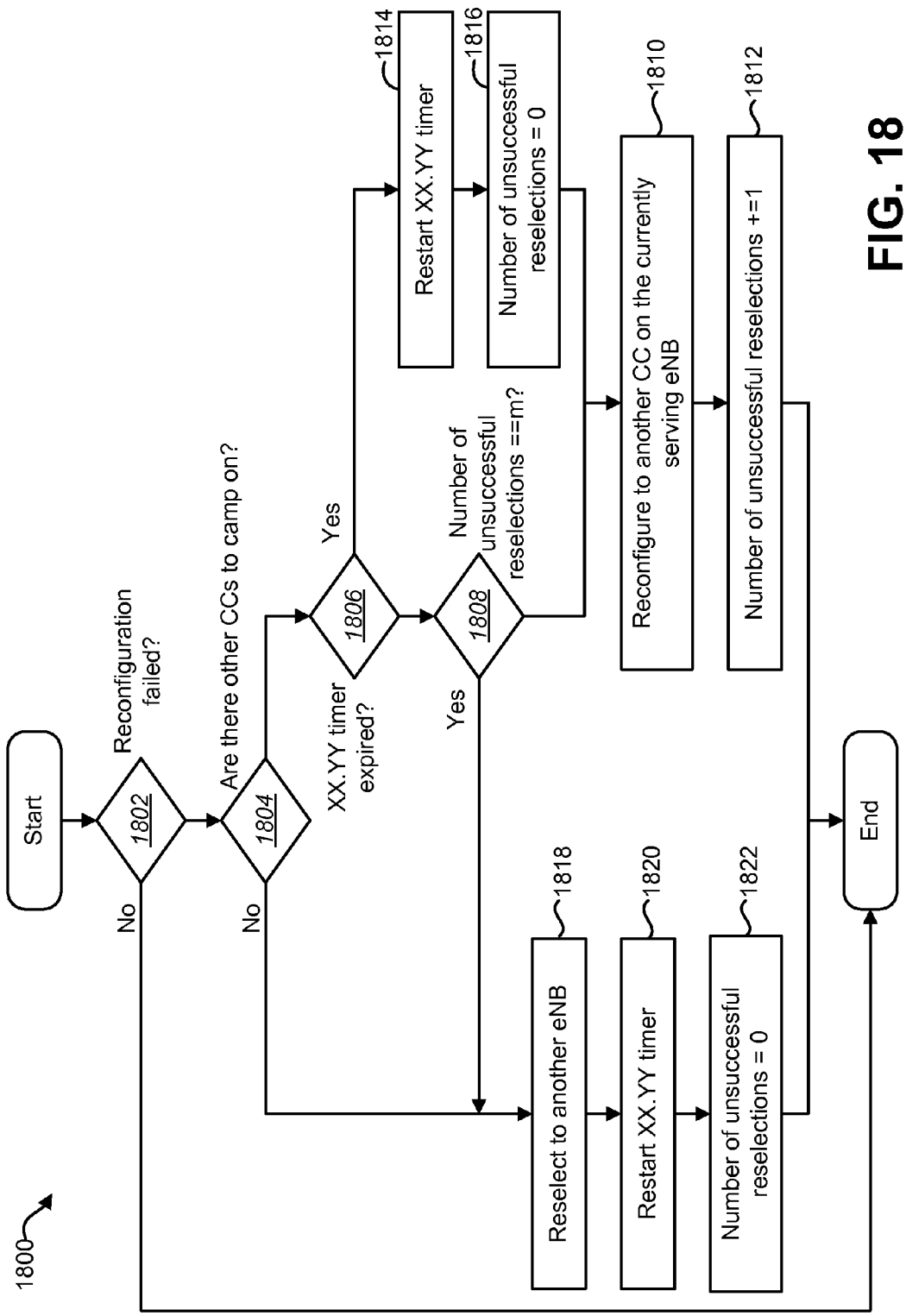
FIG. 18 illustrates a method that may be implemented in a UE in order to determine if reselection to another eNB is necessary after a failed reconfiguration.

FIG. 18 illustrates a method 1800 that may be implemented in a UE in order to determine if reselection to another eNB is necessary after a failed reconfiguration. In the method 1800, a UE may determine 1802 whether a reconfiguration has failed. If not, the method 1800 may end.

If the UE determines 1802 that a reconfiguration has failed, then the UE may determine 1804 whether there are other available CCs to camp on. If there are, then the UE may determine 1806 whether a timer has expired. If it has not yet expired, then the UE may determine 1808 whether the number of unsuccessful reselections within a defined time period (which is indicated by the timer) is equal to a defined value ("m"). If it is not, then the UE may attempt to reconfigure 1810 to another CC on the currently serving eNB. If the reconfiguration attempt fails, a variable that indicates the number of unsuccessful reselections within the defined time period may then be incremented 1812.

If the UE determines 1806 that the timer has expired, then the UE may restart 1814 the timer and reset 1816 the variable that indicates the number of unsuccessful reselections within the defined time period to zero. The UE may then reconfigure 1810 to another CC on the currently serving eNB, and proceed in the manner described above.

If the UE determines 1804 that there are not any other available CCs to camp on, then the UE may reselect 1818 to another eNB, restart 1820 the timer, and reset 1822 the variable that indicates the number of unsuccessful reselections within the defined time period to zero.

If the UE determines 1808 that the number of unsuccessful reselections within the defined time period is equal to m, then the UE may reselect 1818 to another eNB and proceed in the manner described above.

Figure 19:
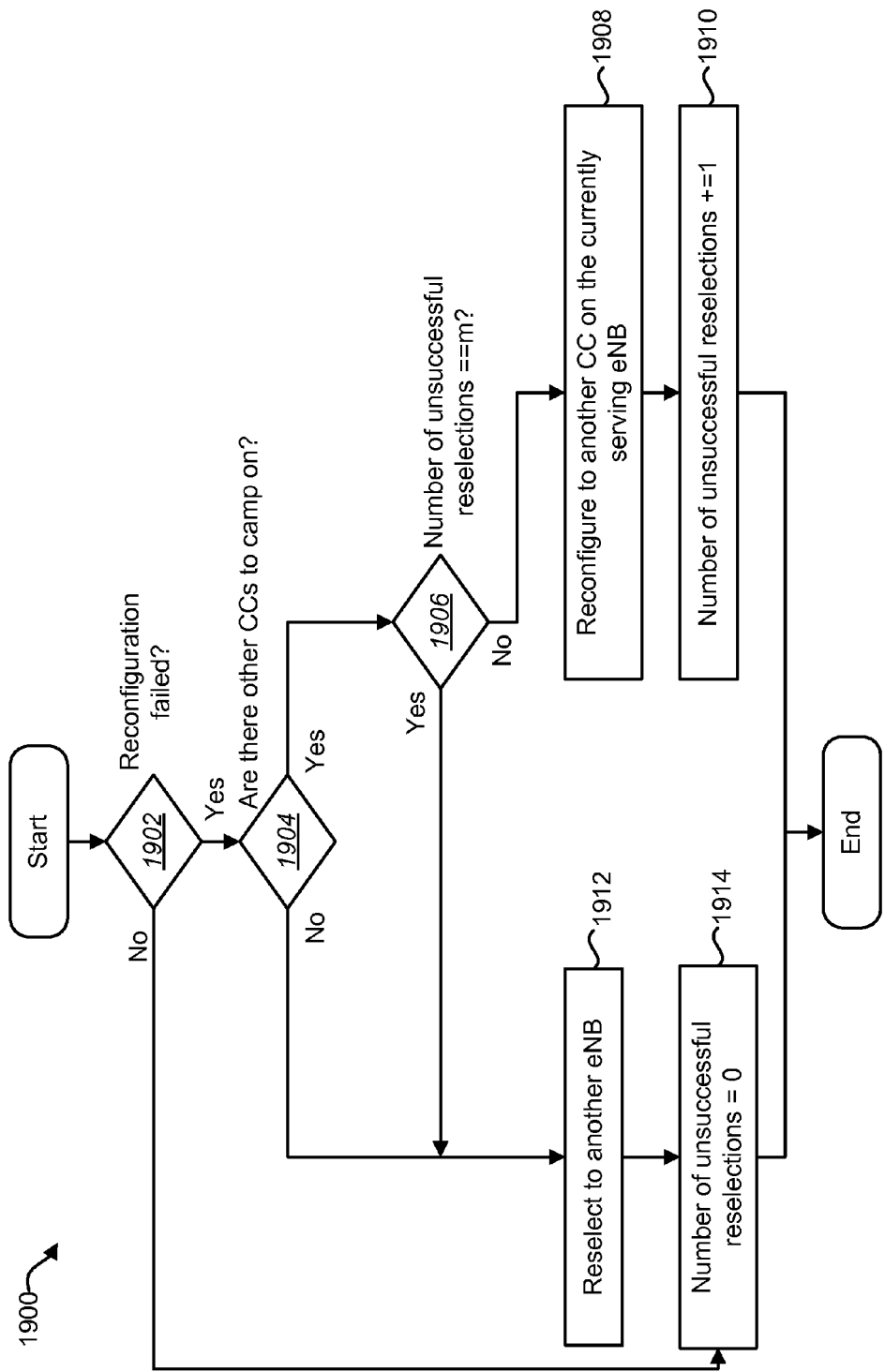
FIG. 19 illustrates another method that may be implemented in a UE in order to determine if reselection to another eNB is necessary after a failed reconfiguration.

FIG. 19 illustrates another method 1900 that may be implemented in a UE in order to determine if reselection to another eNB is necessary after a failed reconfiguration. In the method 1900, a UE may determine 1902 whether a reconfiguration has failed. If not, a variable that indicates the number of sequential unsuccessful reselections may be reset 1914 to zero, and the method 1900 may end.

If the UE determines 1902 that a reconfiguration has failed, the UE may then determine 1904 whether there are other available CCs to camp on. If there are, then the UE may determine 1906 whether a variable that indicates the number of sequential unsuccessful reselections is equal to a defined value ("m"). If not, the UE may attempt to reconfigure 1908 to another CC on the currently serving eNB. If the reconfiguration attempt fails, then the UE may increment 1910 the variable that indicates the number of sequential unsuccessful reselections.

If the UE determines 1904 that there are not any other available CCs to camp on, then the UE may reselect 1912 to another eNB. Also, if the UE determines 1906 that the number of sequential unsuccessful reselections is equal to m, then the UE may reselect 1912 to another eNB. The UE may then reset 1914 the variable that indicates the number of sequential unsuccessful reselections to zero.

Above, systems and methods were described that relate to CC selection for a UE that is in idle mode. Next, systems and methods will be described that relate to CC selection for a UE that is in connected mode.

A desired functionality of an LTE-Advanced system is to be able to "load balance" such that a eNB can command a UE transmitting and receiving on CCx to change its CC allocation to CCy. To implement such a change effectively, the eNB should know the channel conditions between the eNB and the UE (i.e., both the uplink and downlink RF channel conditions). The LTE system uses sounding reference signal (SRS) symbols transmitted by the UE or perhaps other measurement signals at scheduled time/frequency locations to measure the UL channel condition. The system uses received signal strength indication (RSSI), Channel Quality Indicators (CQI) and other metrics based on quality of service (QoS) or grade of service (GoS) as measured by the UE, to determine the downlink channel conditions. Measurements taken by the UE are subsequently transmitted to the eNB, which is measuring uplink channel conditions.

The LTE eUTRAN (Evolved Universal Terrestrial Radio Access Network) measurement procedure does not support a mechanism whereby the eNB can provide the following information and commands to the UE:

1. A UL resource grant indicating time and frequency resource(s) on other CCs whereby the UE is to transmit a SRS or other medium measuring signal.

2. A DL resource grant indicating time and frequency resource(s) on other CCs whereby the UE is to measure the reference signals (RS) and other QoS metrics.

3. A UL resource grant indicating time and frequency resource(s) whereby the UE is to transmit the results of the RSSI, CQI QoS, and/or GoS measurements back to the eNB.

Additionally, the eNB does not currently take into account the results of the above UL and DL measurements when making the determination of which CC the UE should be commanded to change to.

The present disclosure provides means whereby the LTE eUTRAN measurement procedure is extended to include the necessary scheduling and resource grants such that the eNB can command the UE to transmit the SRS in UL channels, measure the RS in DL channels, and transmit the measurement results to the eNB. The above extensions will provide the eNB with the means to determine the best CC to command the UE to change to.

A method for component carrier (CC) selection for a user equipment (UE) that is in connected mode is disclosed. An evolved Node B (eNB) obtains uplink channel condition information corresponding to uplink CCs and downlink channel condition information corresponding to downlink CCs. The eNB selects a CC pair for the UE to use based on the uplink channel condition information and the downlink channel condition information.

In order to obtain the uplink channel condition information, the eNB may send a configuration message to the UE such that the UE can transmit a sounding reference signal (SRS) on other uplink CCs. The eNB may also receive and measure the SRS on the uplink CCs on which the UE was directed to transmit. The eNB may also determine uplink CC channel condition values based on uplink CC SRS measurements. The eNB may also generate a ranking order for each uplink CC. The ranking order may be derived from the uplink CC channel condition values by applying weighted factors.

In order to obtain the downlink channel condition information, the eNB may send a configuration message to the UE such that the UE can take measurement on a reference signal (RS) on other downlink CCs. The eNB may grant to the UE scheduling resources whereby the UE can transmit the RS measurement taken on the other downlink CCs. The eNB may determine downlink CC channel condition values based on downlink CC RS measurements received from the UE. The eNB may generate a ranking order for each downlink CC. The ranking order may be derived from the downlink CC channel condition values by applying weighted factors.

The eNB may initiate the CC selection for the UE when the eNB detects that the UE has transitioned from idle mode to the connected mode. Alternatively, the eNB may be a target eNB that initiates the CC selection for the UE when the eNB detects that the UE has completed a handoff from a source eNB. Alternatively, the eNB may initiate the CC selection for the UE when the eNB detects that the UE has initiated a Target Area (TA) update.

An evolved Node B (eNB) that is configured for component carrier (CC) selection for a user equipment (UE) that is in connected mode is also disclosed. The eNB includes a processor, memory in electronic communication with the processor, and instructions stored in the memory. The instructions are executable to obtain uplink channel condition information corresponding to uplink CCs and to obtain downlink channel condition information corresponding to downlink CCs. The instructions are also executable to select a CC pair for the UE to use based on the uplink channel condition information and the downlink channel condition information.

A method for component carrier (CC) selection for a user equipment (UE) that is in connected mode is also disclosed. A source evolved Node B (eNB) initiates a determination of a target CC of a target eNB for the UE to use following handoff of the UE from the source eNB to the target eNB. The source eNB command the UE to make measurements on the target eNB. The source eNB and the target eNB communicate about time/frequency resources that the UE will use to make the measurements.

The source eNB may initiate the determination of the target CC in response to the source eNB detecting that the UE should prepare for the handoff from the source eNB to the target eNB. Alternatively, the source eNB may initiate the determination of the target CC in response to the source eNB preparing the UE for the handoff from the source eNB to the target eNB.

The UE may send the results of the measurements to the target eNB. The target eNB may analyze the results and determine the target CC. The target eNB may inform the UE of the target CC.

The UE may send the results of the measurements to the source eNB. The source eNB may forward the results to the target eNB. The target eNB may analyze the results and determine the target CC. The target eNB may inform the source eNB of the target CC. The source eNB may inform the UE of the target CC.

Figure 20:
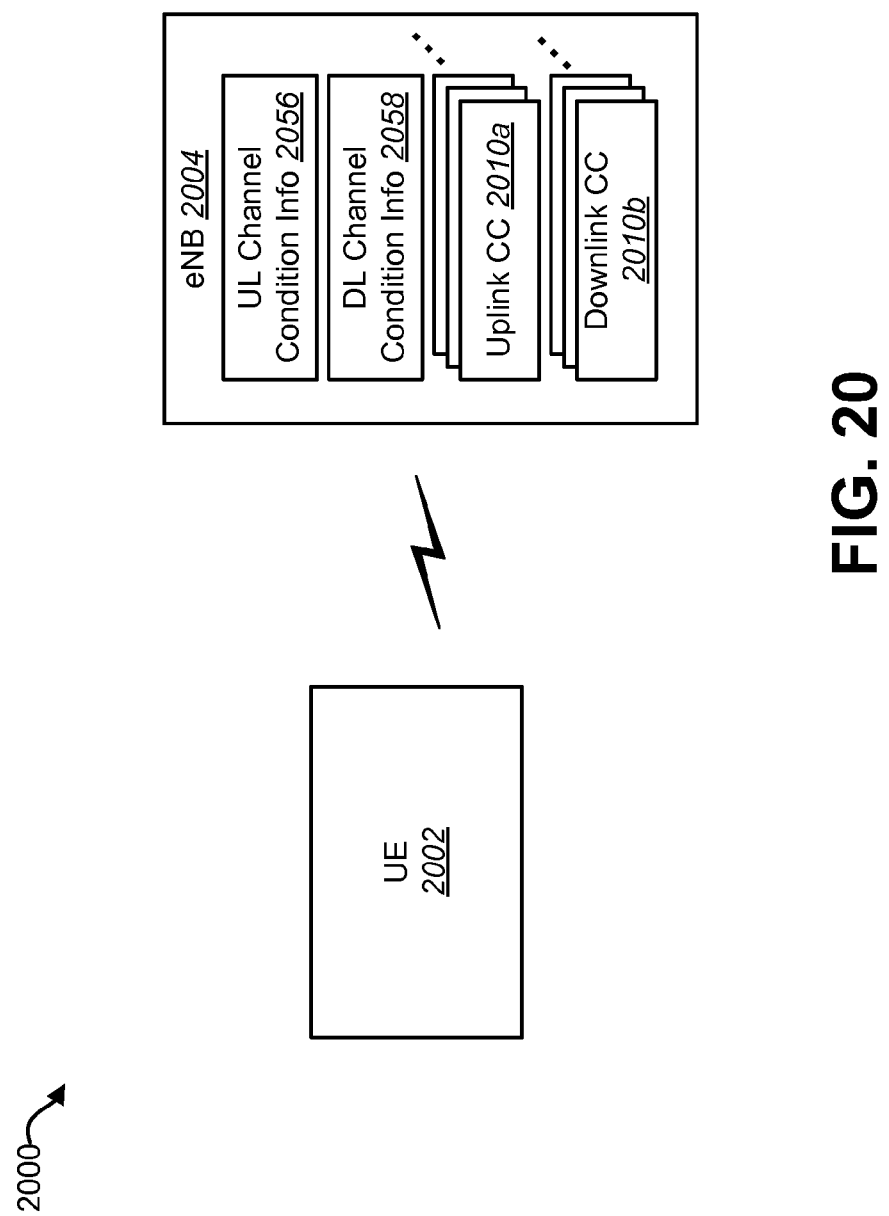
FIG. 20 illustrates another wireless communication system in which at least some of the methods disclosed herein may be implemented.

FIG. 20 illustrates a wireless communication system 2000 that includes a UE 2002 and an eNB 2004. The UE 2002 and the eNB 2004 may be configured to operate in accordance with an LTE-Advanced standard. The total amount of bandwidth that is allocated to the eNB 2004 may be partitioned into separate CCs 2010, which may include uplink CCs 2010a and downlink CCs 2010b. Other items shown in FIG. 20 will be discussed below in connection with the method shown in FIG. 21.

Figure 21:
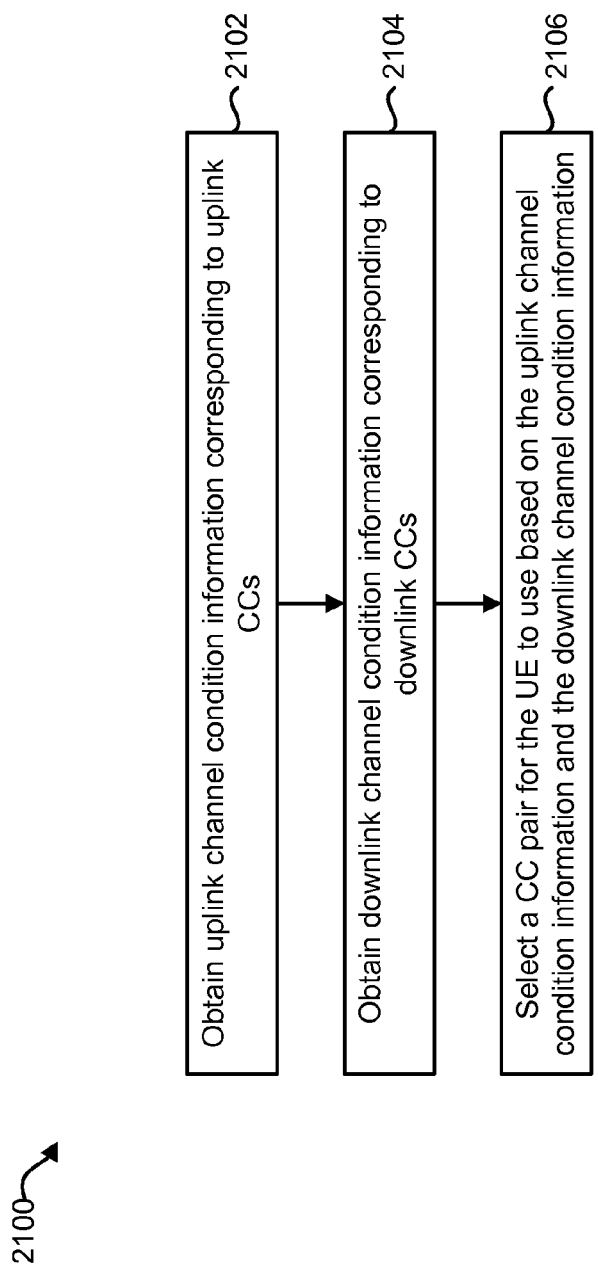
FIG. 21 illustrates a method for component carrier selection in the wireless communication system of FIG. 20.

FIG. 21 illustrates a method 2100 for CC selection in a wireless communication system 2000. The method 2100 may be implemented when the UE 2002 is in connected mode. The UE 2002 may obtain 2102 uplink channel condition information 2056 corresponding to the uplink CCs 2010a. The UE 2002 may also obtain 2104 downlink channel condition information 2058 corresponding to the downlink CCs 2010b. The UE 2002 may select 2106 a CC pair (e.g., an uplink CC 2010a and a corresponding downlink CC 2010b) for the UE 2002 to use based on the uplink channel condition information 2056 and the downlink channel condition information 2058.

Figure 22:
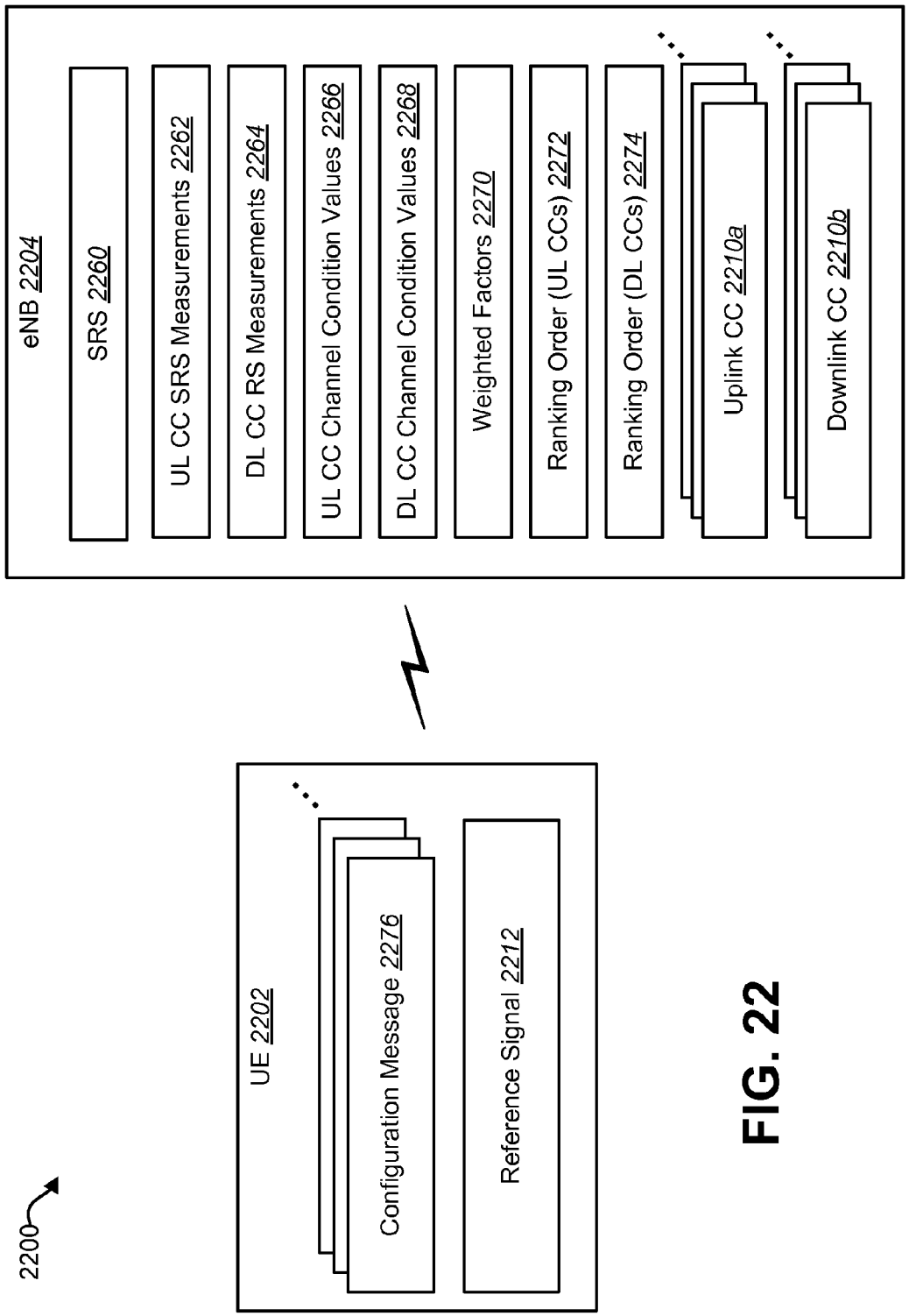
FIG. 22 illustrates another wireless communication system in which at least some of the methods disclosed herein may be implemented.

FIG. 22 illustrates another wireless communication system 2200 that includes a UE 2202 and an eNB 2204. The UE 2202 and the eNB 2204 may be configured to operate in accordance with an LTE-Advanced standard. The total amount of bandwidth that is allocated to the eNB 2204 may be partitioned into separate CCs 2210, which may include uplink CCs 2210a and downlink CCs 2210b. Other items shown in FIG. 22 will be discussed below in connection with the method shown in FIG. 23.

Figure 23:
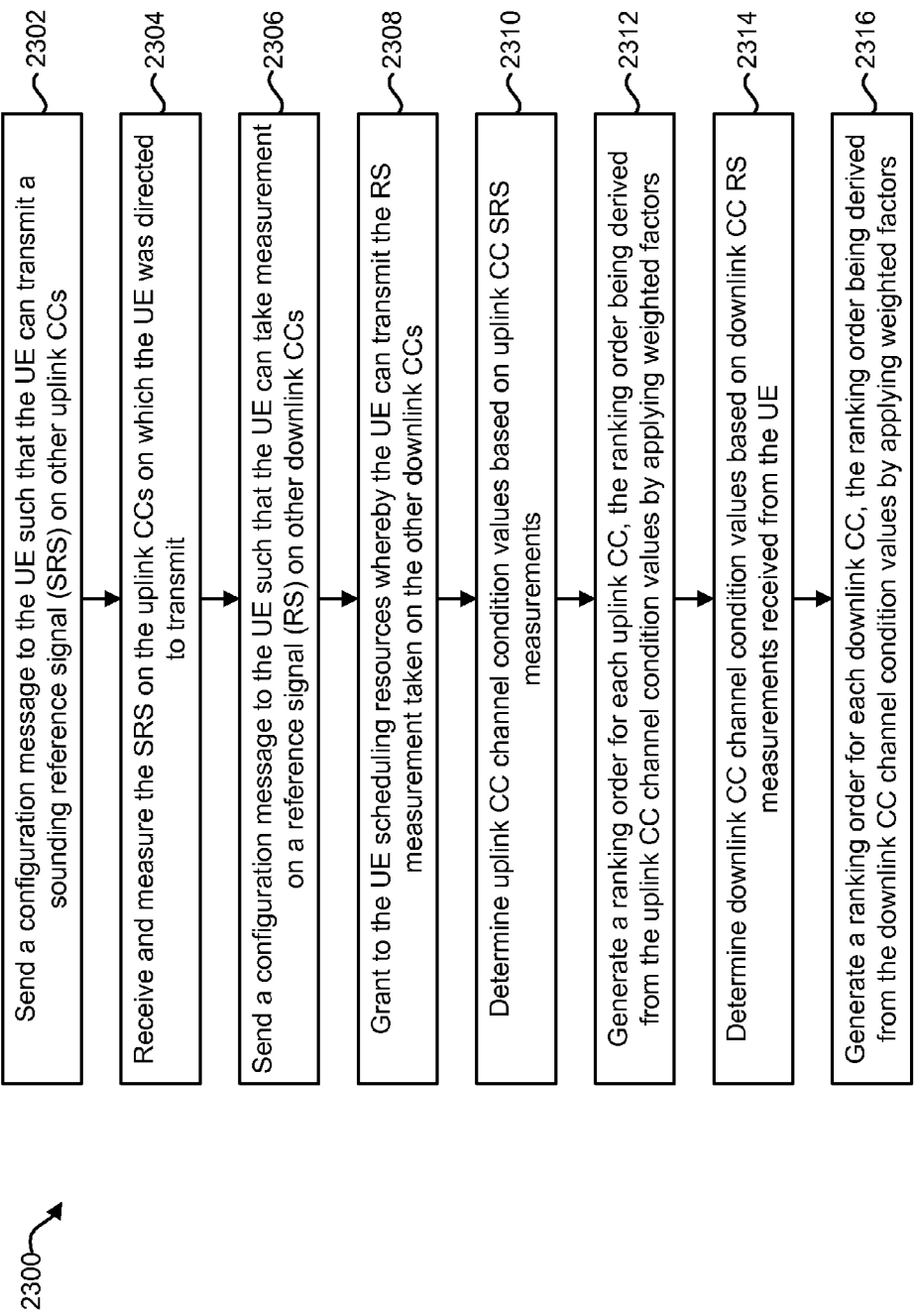
FIG. 23 illustrates a method for component carrier selection in the wireless communication system of FIG. 22.

FIG. 23 illustrates a method 2300 for CC selection in a wireless communication system 2200. The method 2300 may be implemented in the eNB 2204 when the UE 2202 is in connected mode.

In the depicted method 2300, the eNB 2204 may send 2302 a configuration message 2276 to the UE 2202 such that the UE 2202 can transmit a sounding reference signal (SRS) 2260 on other uplink CCs 2210a. The eNB 2204 may receive and measure 2304 the SRS 2260 on the uplink CCs 2210a on which the UE 2202 was directed to transmit.

The eNB 2204 may send 2306 a configuration message 2276 to the UE 2202 such that the UE 2202 can take measurement on a reference signal (RS) 2212 on other downlink CCs 2210b. The eNB 2204 may grant 2308 to the UE 2202 scheduling resources whereby the UE 2202 can transmit the RS measurements 2264 taken on the other downlink CCs 2210b.

The eNB 2204 may determine 2310 uplink CC channel condition values 2266 based on uplink CC SRS measurements 2262. The eNB 2204 may generate 2312 a ranking order 2272 for each uplink CC 2210a. The ranking order 2272 may be derived from the uplink CC channel condition values 2266 by applying weighted factors 2270. Examples of weighted factors 2270 include loading, sectorization, UE speed, UE location, time of day, phase of the moon, etc.

The eNB 2204 may determine 2314 downlink CC channel condition values 2268 based on downlink CC RS measurements 2264 received from the UE 2202. The eNB 2204 may generate 2316 a ranking order 2274 for each downlink CC 2210b. The ranking order 2274 may be derived from the downlink CC channel condition values 2268 by applying weighted factors 2270.

The method 2300 may be performed by an eNB 2204 in response to the eNB 2204 detecting that an LTE-Advanced UE 2202 has transitioned from idle mode to connected mode. Alternatively, the method 2300 may be performed by an eNB 2204 in response to the eNB 2204 detecting that an LTE-Advanced UE 2202 has initiated a Target Area (TA) update. A TA is a logical grouping of eNBs. A TA update is a procedure whereby the UE 2202 (when it is idle mode) notifies the EUTRA that it has moved (i.e., reselected) from an eNB that is part of TA[1] to an eNB that is part of TA[2]. Alternatively, the method 2300 may be performed by a target eNB 2204 in response to the target eNB 2204 detecting that an LTE-Advanced UE 2202 has completed a handoff from a source eNB.

Figure 24:
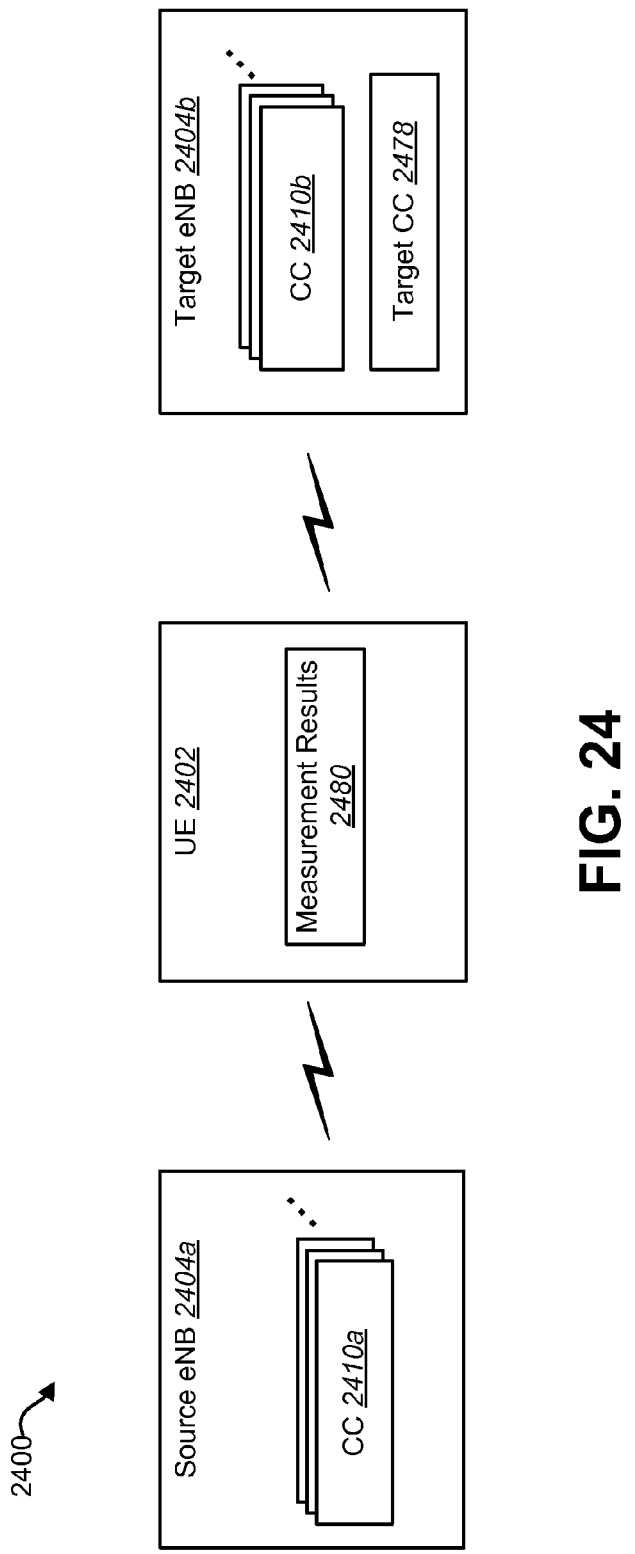
FIG. 24 illustrates another wireless communication system in which at least some of the methods disclosed herein may be implemented.

FIG. 24 illustrates a wireless communication system 2400 that includes a UE 2402, a source eNB 2404a and a target eNB 2204b. The UE 2402 and the eNBs 2404a, 2404b may be configured to operate in accordance with an LTE-Advanced standard. The total amount of bandwidth that is allocated to the eNBs 2404a, 2404b may be partitioned into separate CCs 2410*a*, 2410*b*. Other items shown in FIG. 24 will be discussed below in connection with the methods shown in FIGS. 25 and 26.

Figure 25:
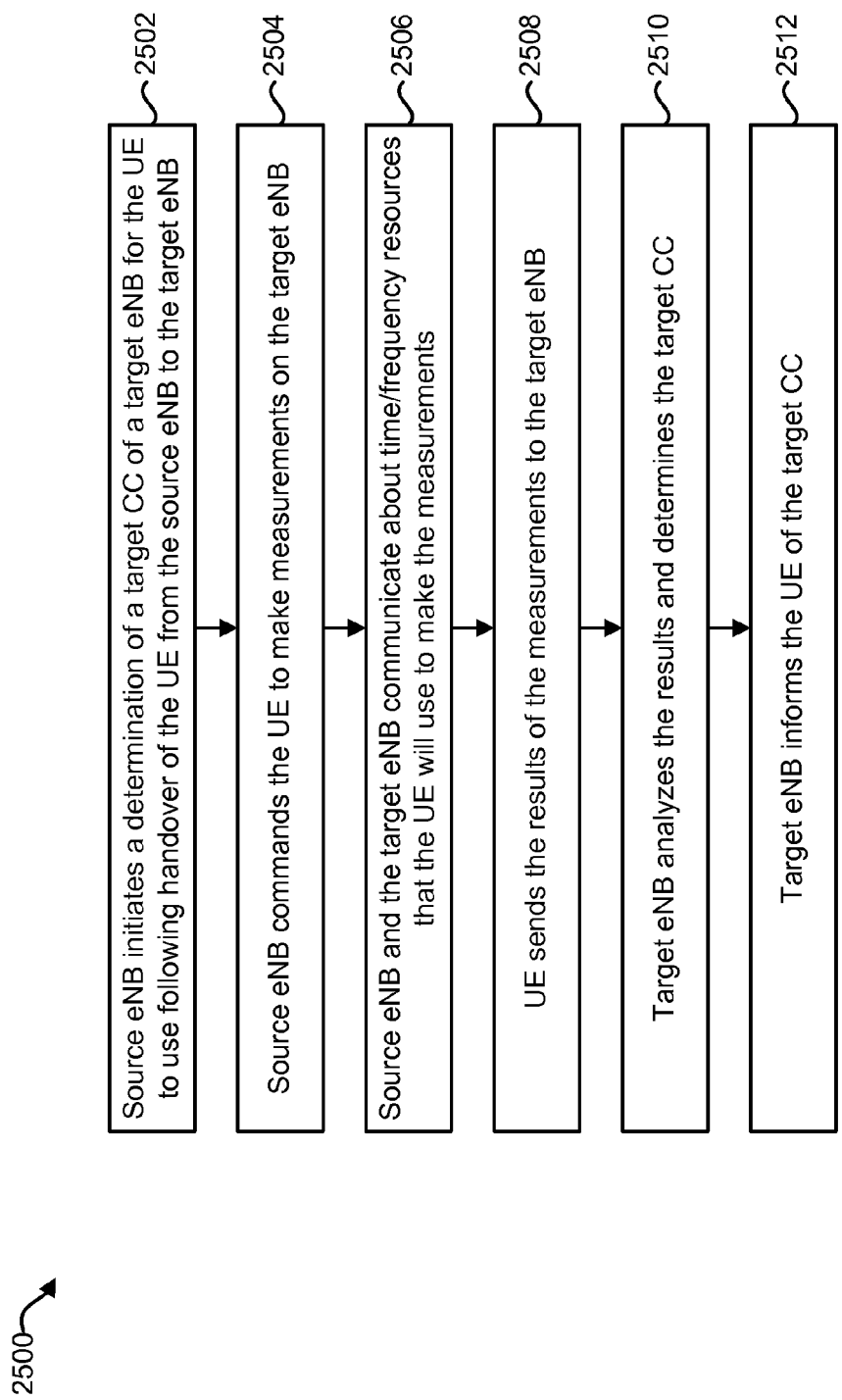
FIG. 25 illustrates a method for component carrier selection in the wireless communication system of FIG. 24.

FIG. 25 illustrates a method 2500 for CC selection in a wireless communication system 2400. The method 2500 may be implemented when the UE 2402 is in connected mode. The source eNB 2404*a* may initiate the method 2500 as part of the source eNB 2404*a* detecting that the UE 2402 should prepare for a handoff from the source eNB 2404*a* to the target eNB 2404*b*.

In the depicted method 2500, the source eNB 2404*a* may initiate 2502 a determination of a target CC 2478 of the target eNB 2404*b* for the UE 2402 to use following handoff of the UE 2402 from the source eNB 2404*a* to the target eNB 2404*b*. The source eNB 2404*a* may command 2504 the UE 2402 to make measurements on the target eNB 2404*b*. The source eNB 2404*a* and the target eNB 2404*b* may communicate 2506 about time/frequency resources that the UE 2402 will use to make the measurements. The UE 2402 may send 2508 the results 2480 of the measurements to the target eNB 2404*b*. The target eNB 2404*b* may analyze the results 2480 and determine 2510 the target CC 2478. The target eNB 2404*b* may inform 2512 the UE 2402 of the target CC 2478.

Figure 26:
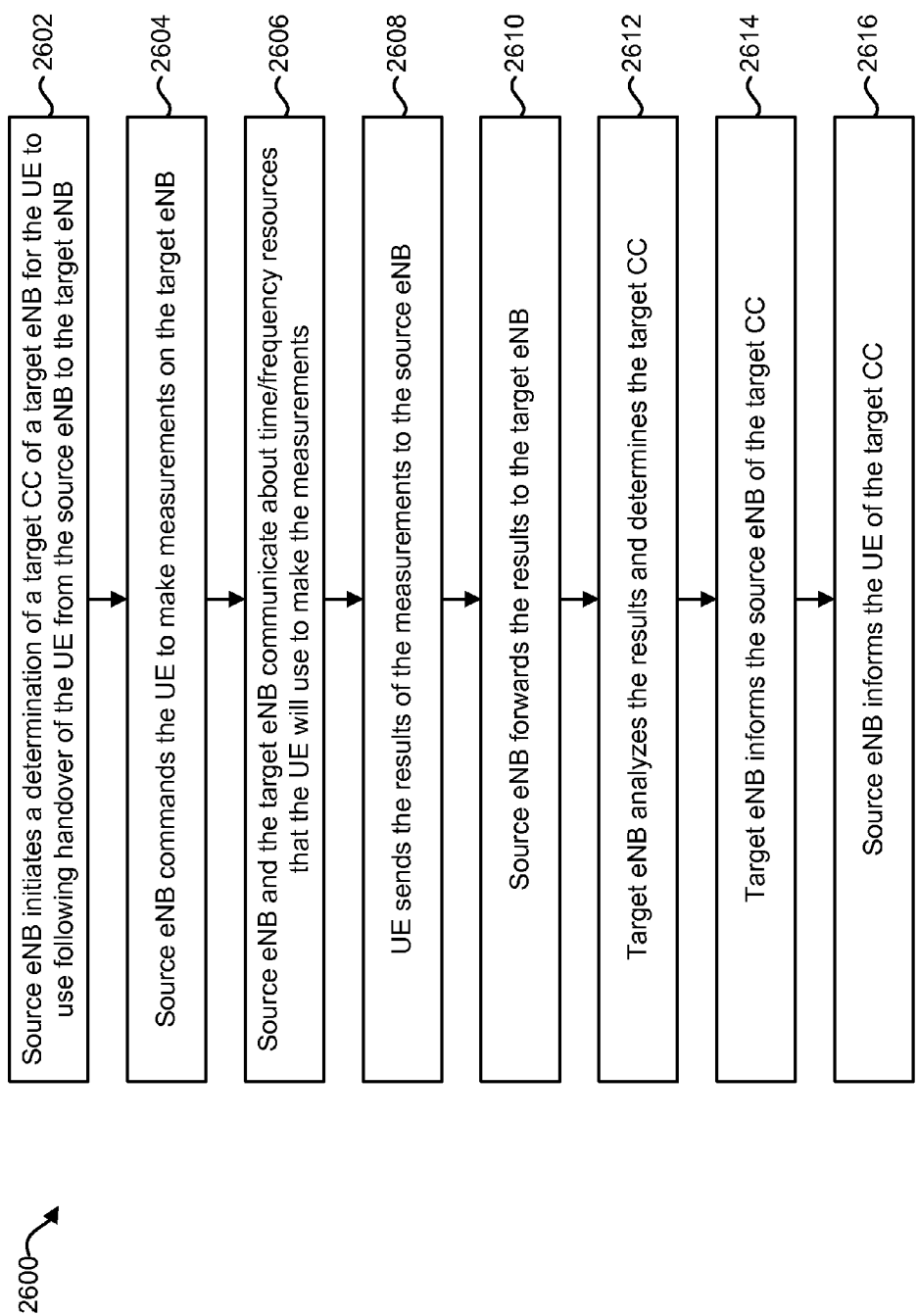
FIG. 26 illustrates another method for component carrier selection in the wireless communication system of FIG. 24.

FIG. 26 illustrates another method 2600 for CC selection in a wireless communication system 2400. The method 2600 may be implemented when the UE 2402 is in connected mode. The source eNB 2404*a* may initiate the method 2600 as part of the source eNB 2404*a* preparing the UE 2402 for a handoff from the source eNB 2404*a* to the target eNB 2404*b*.

In the depicted method 2600, the source eNB 2404*a* may initiate 2602 a determination of a target CC 2478 of the target eNB 2404*b* for the UE 2402 to use following handoff of the UE 2402 from the source eNB 2404*a* to the target eNB 2404*b*. The source eNB 2404*a* may command 2604 the UE 2402 to make measurements on the target eNB 2404*b*. The source eNB 2404*a* and the target eNB 2404*b* may communicate 2606 about time/frequency resources that the UE 2402 will use to make the measurements. The UE 2402 may send 2608 the results 2480 of the measurements to the source eNB 2404*a*. The source eNB 2404*a* may forward 2610 the results 2480 to the target eNB 2404*b*. The target eNB 2404*b* may analyze the results 2480 and determine 2612 the target CC 2478. The target eNB 2404*b* may inform 2614 the source eNB 2404*a* of the target CC 2478. The source eNB 2404*a* may inform 2616 the UE 2402 of the target CC 2478.

Figure 27:
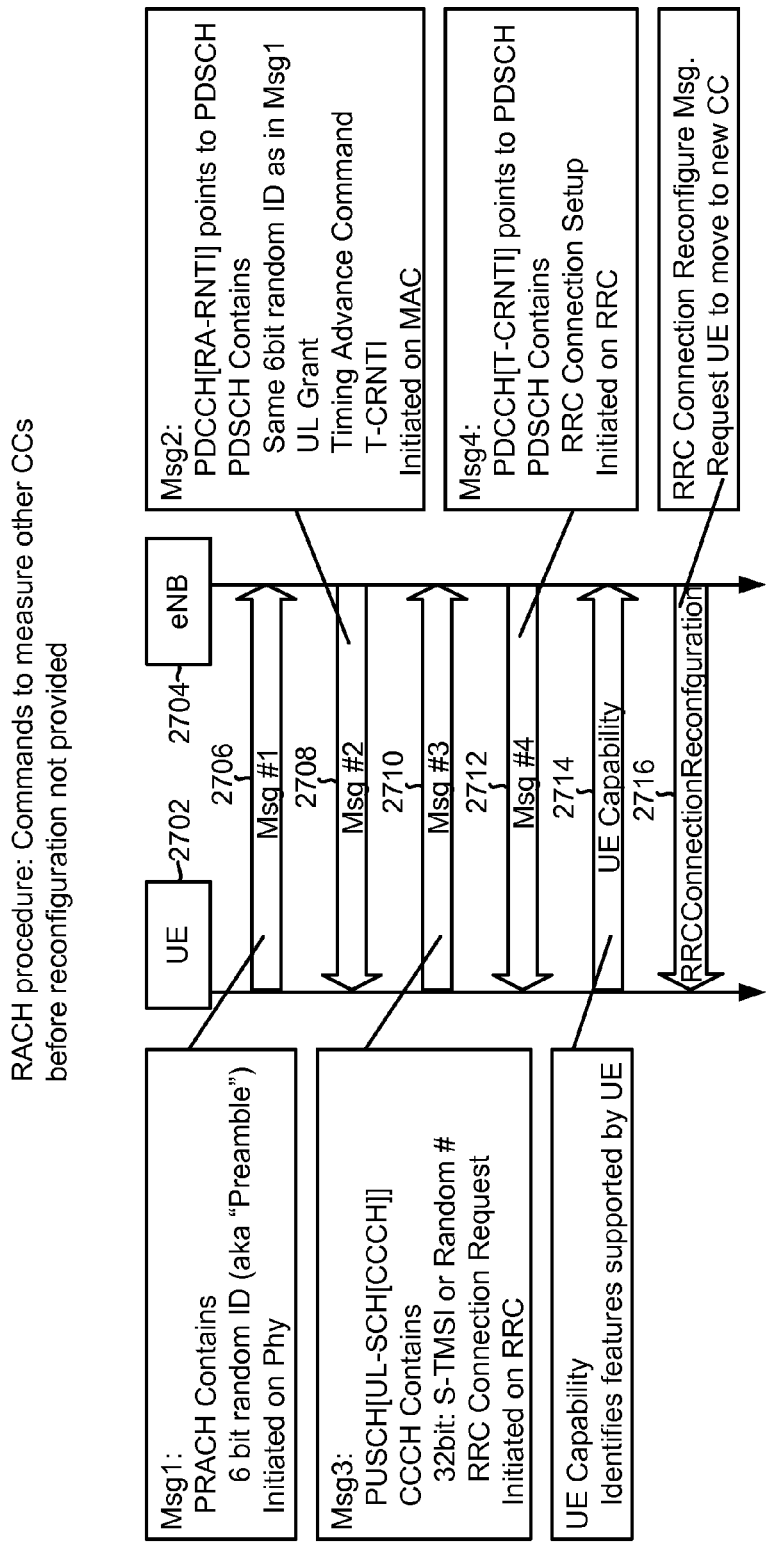
FIG. 27 illustrates a RACH procedure, where commands to measure other CCs before reconfiguration are not provided.

FIG. 27 illustrates a RACH procedure, where commands to measure other CCs before reconfiguration are not provided. A UE 2702 sends a first message 2706 to an eNB 2704. The first message 2706 is sent via the PRACH (Physical Random Access Channel). The first message 2706 includes a 6-bit random ID (also known as the "preamble"). The first message 2706 is initiated on the physical layer.

The eNB 2704 then sends a second message 2708 to the UE 2702. The second message 2708 is sent via the PDCCH[RA-RNTI] (PDCCH stands for the Physical Downlink Control Channel, and RNTI stands for Radio Network Temporary Identifier), which points to the PDSCH. The PDSCH (Physical Downlink Shared Channel) contains the same 6-bit random ID as in the first message 2706, an uplink grant, a timing advance command, and a T-CRNTI (Temporary Cell RNTI). The second message 2708 is initiated on the MAC (Medium Access Control) layer.

The UE 2702 then sends a third message 2710 to the eNB 2704. The third message 2710 is sent via the PUSCH[UL-SCH[CCCH]] (PUSCH stands for Physical Uplink Shared Channel, UL-SCH stands for Uplink Shared Channel, and CCH stands for Common Control Channel). The CCCH includes a 32-bit S-TMSI (S-Temporary Mobile Subscriber Identity) or random number, and an RRC (Radio Resource Control) connection request. The third message 2710 is initiated on the RRC.

The eNB 2704 then sends a fourth message 2712 to the UE 2702. The fourth message 2712 is sent via the PDCCH[T-CRNTI], which points to the PDSCH. The PDSCH contains the RRC connection setup. The fourth message 2712 is initiated on the RRC.

The UE 2702 then sends a fifth message 2714 to the eNB 2704. The fifth message 2714 indicates the UE's capability, i.e., it identifies features that are supported by the UE 2702. The eNB 2704 then sends a sixth message 2716 to the UE 2702. The sixth message 2716 includes an RRC connection reconfiguration message, which requests that the UE 2702 move to a new CC.

Figure 28:
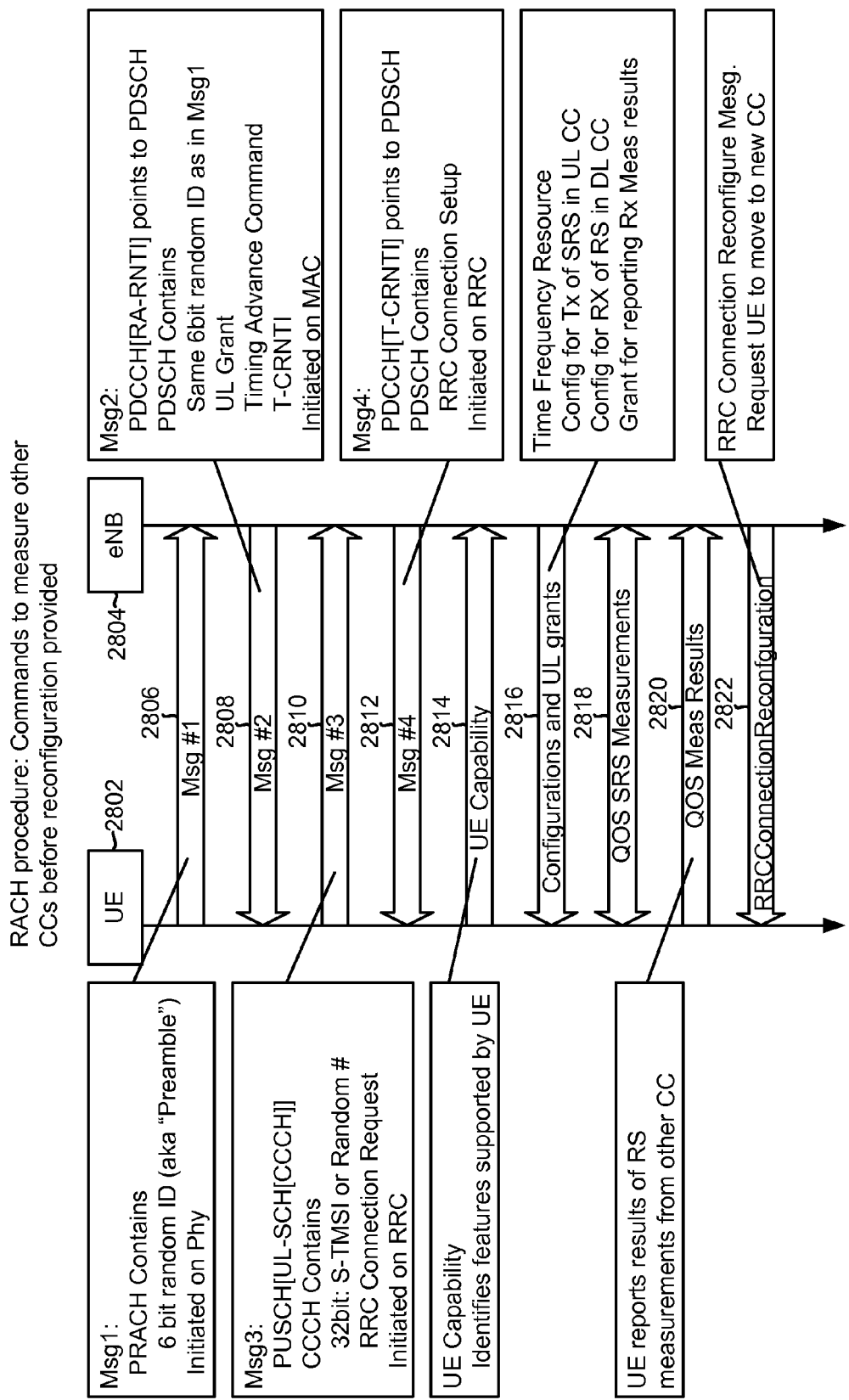
FIG. 28 illustrates a RACH procedure, where commands to measure other CCs before reconfiguration are provided.

FIG. 28 illustrates a RACH procedure, where commands to measure other CCs before reconfiguration are provided. A UE 2802 sends a first message 2806 to an eNB 2804. The first message 2806 is sent via the PRACH. The first message 2806 includes a 6-bit random ID (also known as the "preamble"). The first message 2806 is initiated on the physical layer.

The eNB 2804 then sends a second message 2808 to the UE 2802. The second message 2808 is sent via the PDCCH[RA-RNTI], which points to the PDSCH. The PDSCH includes the same 6-bit random ID as in the first message 2806, an uplink grant, a timing advance command, and a T-CRNTI. The second message 2808 is initiated on the MAC layer.

The UE 2802 then sends a third message 2810 to the eNB 2804. The third message 2810 is sent via the PUSCH[UL-SCH[CCCH]]. The CCCH contains a 32-bit S-TMSI or random number and an RRC connection request. The third message 2810 is initiated on the RRC.

The eNB 2804 then sends a fourth message 2812 to the UE 2802. The fourth message 2812 is sent via the PDCCH[T-CRNTI], which points to the PDSCH. The PDSCH contains an RRC connection setup. The fourth message 2812 is initiated on the RRC.

The UE 2802 then sends a fifth message 2814 to the eNB 2804. The fifth message 2814 indicates the UE's capability, i.e., it identifies features that are supported by the UE 2802. The eNB 2804 then sends a sixth message 2816 to the UE 2802. The sixth message 2816 indicates time/frequency resources, including the configuration for transmission of SRS in uplink CCs, the configuration for reception of RS in downlink CCs, and the grant for reporting the measurement results. The UE 2802 and the eNB 2804 then exchange QOS SRS measurements 2818. The UE 2802 then sends a message 2820 to the eNB 2804 reporting the results of RS measurements from other CCs. The eNB 2804 sends an RRC connection reconfiguration message 2822 to the UE 2802, requesting that the UE 2802 move to a new CC.

Figure 29:
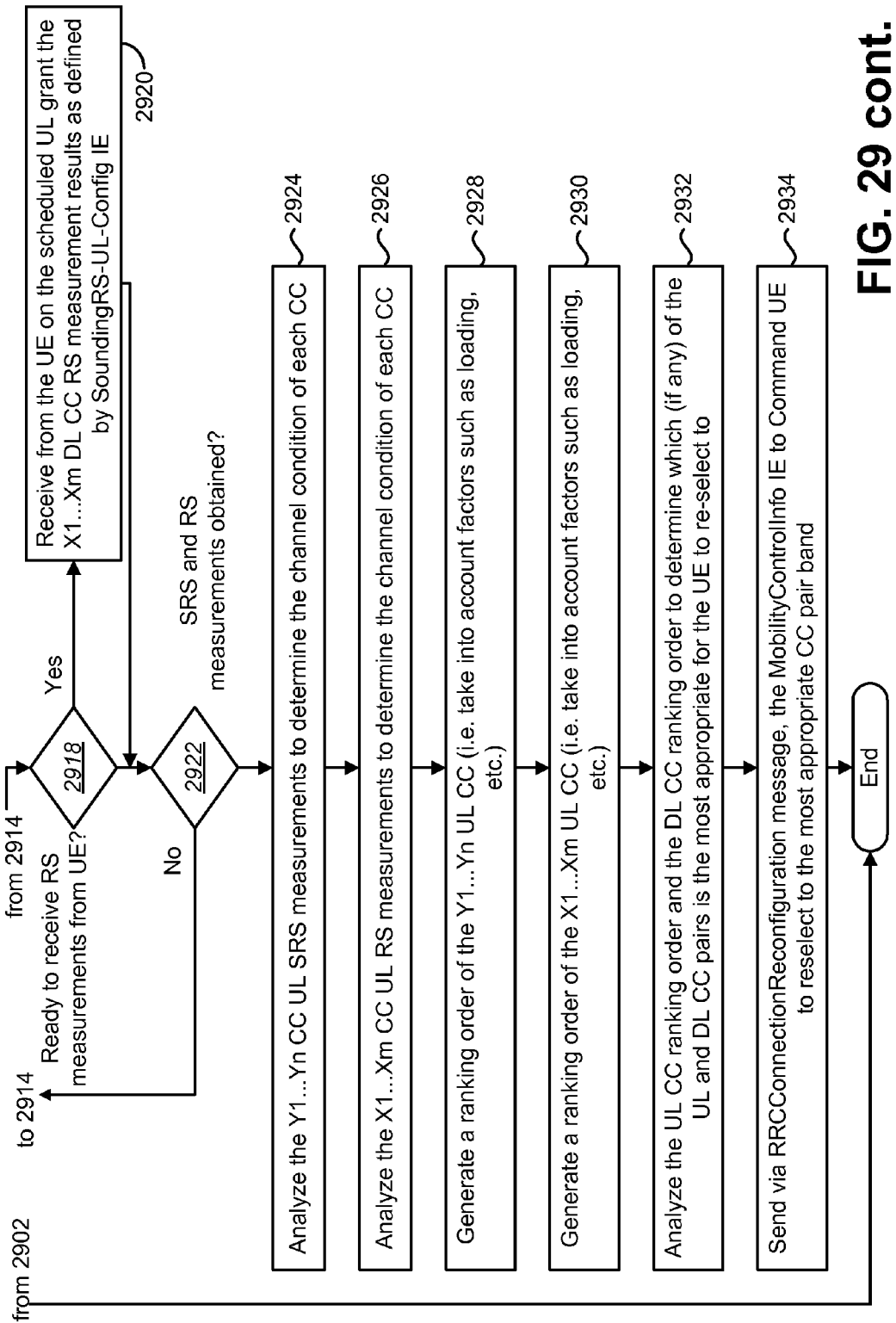
FIG. 29 illustrates a method that may be performed by an eNB for determining the best CC band pair for a UE.

FIG. 29 illustrates a method 2900 that may be performed by an eNB for determining the best CC band pair for a UE. In the method 2900, the eNB may determine 2902 whether the UE is of type LTE-Advanced. If not, the method 2900 may end. If the UE is of type LTE-Advanced, then the eNB may define 2904 "Y1 . . . Yn" as the set of UL CCs that the eNB considers available for the UE, and "X1 . . . Xm" as the set of DL CCs that the eNB considers available for the UE.

The eNB may create 2906 a SoundingRS-UL-Config IE that identifies that time and frequency resources for SRS transmission in the Y1 . . . Yn UL CCs. The eNB may create 2908 a Measurement Configuration IE that identifies the time and frequency resources and measurement gaps for RS reception in the X1 . . . Xm DL CCs. The eNB may send 2910, via an RRCConnectionReconfiguration message, the Measurement Configuration IE and the SoundingRS-UL-Config IE. The eNB may send 2912 an UL grant such that the UE can report the RS measurements on the X1 . . . Xm DL CCs.

When the eNB determines 2914 that it is ready to measure SRS transmissions, then it may measure 2916 the SRS transmitted by the UE on the designated time and frequency resources of the Y1 . . . Yn UL CCs. When the eNB determines 2918 that it is ready to receive RS measurements from the UE, then the eNB may receive 2920 from the UE on the scheduled UL grant the X1 . . . Xm DL CC RS measurement results as defined by the SoundingRS-UL-Config IE.

When the eNB determines 2922 that the SRS and RS measurements have been obtained, then the eNB may analyze 2924 the Y1 . . . Yn CC UL SRS measurements to determine the channel condition of each CC. The eNB may also analyze 2926 the X1 . . . Xm CC UL RS measurements to determine the channel condition of each CC. The eNB may generate 2928 a ranking order of the Y1 . . . Yn UL CCs (i.e., taking into account factors such as loading, etc.). The eNB may generate 2930 a ranking order of the X1 . . . Xm DL CCs (i.e., taking into account factors such as loading, etc.). The eNB may analyze 2932 the UL CC ranking order and the DL CC ranking order to determine which (if any) of the UL and DL CC pairs is the most appropriate for the UE to re-select to. The eNB may send 2934, via an RRCConnectionReconfiguration message, the MobilityControlInfo IE to command the UE to reselect to the most appropriate CC pair band.

Figure 30:
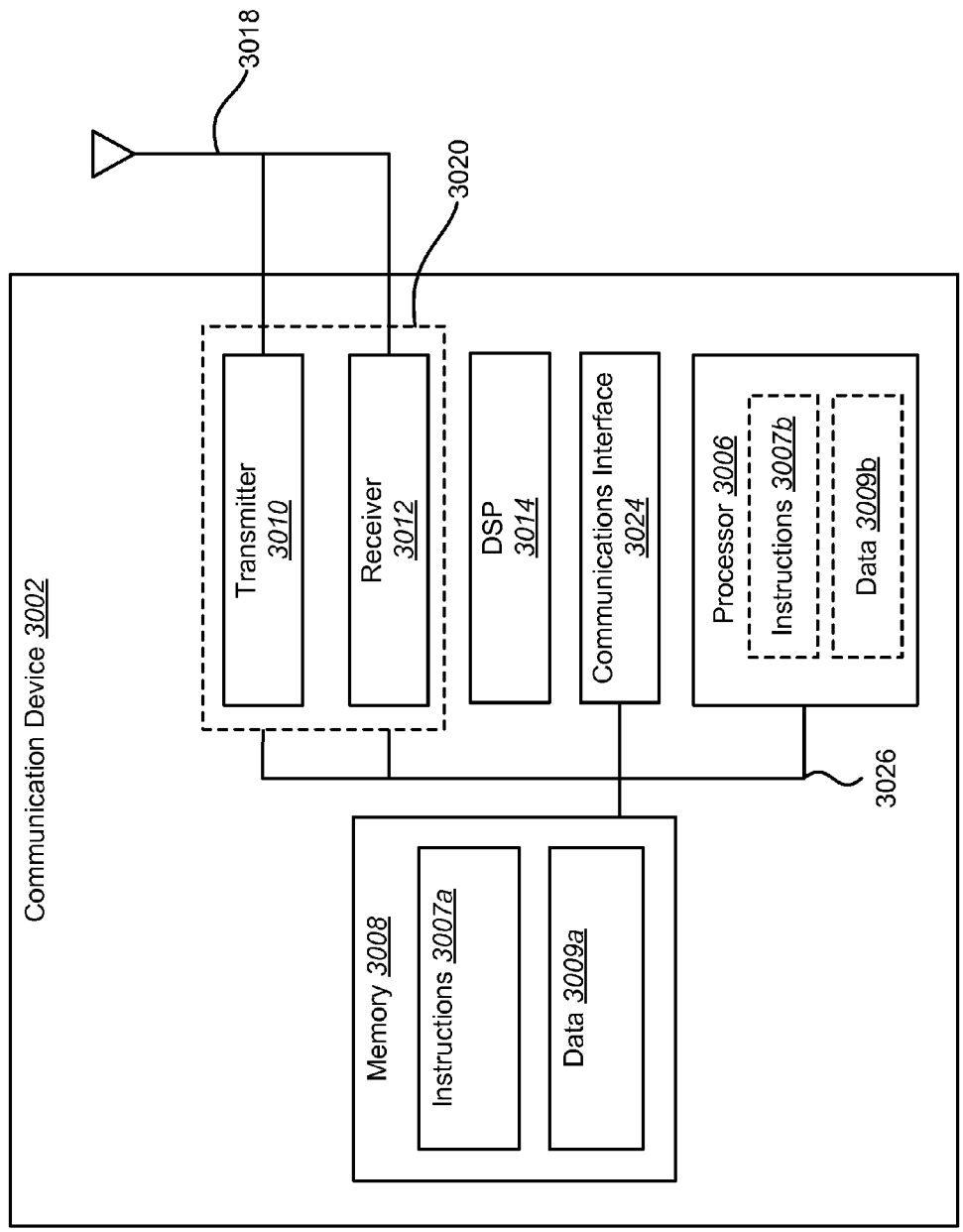
FIG. 30 illustrates various components that may be utilized in a communication device.

FIG. 30 illustrates various components that may be utilized in a communication device 3002. The communication device 3002 may be a UE or an eNB. The communication device 3002 includes a processor 3006 that controls operation of the communication device 3002. The processor 3006 may also be referred to as a CPU. Memory 3008, which may include both read-only memory (ROM), random access memory (RAM) or any type of device that may store information, provides instructions 3007a and data 3009a to the processor 3006. A portion of the memory 3008 may also include non-volatile random access memory (NVRAM). Instructions 3007b and data 3009b may also reside in the processor 3006. Instructions 3007b loaded into the processor 3006 may also include instructions 3007a from memory 3008 that were loaded for execution by the processor 3006. The instructions 3007 may be executed by the processor 3006 to implement the methods disclosed herein.

The communication device 3002 may also include a housing that contains a transmitter 3010 and a receiver 3012 to allow transmission and reception of data. The transmitter 3010 and receiver 3012 may be combined into a transceiver 3020. An antenna 3018 is attached to the housing and electrically coupled to the transceiver 3020. Additional antennas may also be used.

The various components of the communication device 3002 are coupled together by a bus system 3026 which may include a power bus, a control signal bus, and a status signal bus, in addition to a data bus. However, for the sake of clarity, the various buses are illustrated in FIG. 30 as the bus system 3026. The communication device 3002 may also include a digital signal processor (DSP) 3014 for use in processing signals. The communication device 3002 may also include a communications interface 3024 that provides user access to the functions of the communication device 3002. The communication device 3002 illustrated in FIG. 30 is a functional block diagram rather than a listing of specific components.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for a user equipment (UE) that is in connected mode, comprising:
   communicating with a source evolved Node B (eNB) using a plurality of component carriers;
   receiving a command to make measurements on a target eNB;
   measuring time/frequency resources; and
   sending results of the measurements on the time/frequency resources to the source eNB;
   wherein the source eNB initiates a determination of a target component carrier (CC) of a target eNB;
   wherein the source eNB forwards the results of the measurements on the time/frequency resources to the target eNB;
   wherein the source eNB and the target eNB communicate to determine time/frequency resources that the UE will use to make the measurements; and
   wherein the target CC is for the UE to use following handoff of the UE from the source eNB to the target eNB.

2. The method of claim 1, wherein the source eNB initiates the determination of the target CC in response to the source eNB detecting that the UE should prepare for the handoff from the source eNB to the target eNB.

3. The method of claim 1, wherein the source eNB initiates the determination of the target CC in response to the source eNB preparing the UE for the handoff from the source eNB to the target eNB.

4. The method of claim 1, further comprising:
   the UE sending results of the measurements to the target eNB;
   the target eNB analyzing the results and determining the target CC; and
   the target eNB informing the UE of the target CC.

5. The method of claim 1, further comprising:
   the target eNB analyzing the results and determining the target CC;
   the target eNB informing the source eNB of the target CC; and
   the source eNB informing the UE of the target CC.

6. A source evolved Node B (eNB) comprising:
   a processor;
   memory in electronic communication with the processor;
   instructions stored in the memory, the instructions being executable to:
      communicate with a user equipment (UE) using a plurality of component carrier (CC);
      initiate a determination of a target CC of a target evolved Node B(eNB), wherein the target CC is for the UE to use following handoff of the UE from the source eNB to the target eNB;
      command the UE to make measurements on the target eNB;
      communicate with the target eNB to determine time/frequency resources that the UE will use to make the measurements;

receive results of the measurements on the time/frequency resources from the UE; and forward the results of the measurements on the time/frequency resources to the target eNB.

7. A non-transitory processor-readable medium comprising executable instructions, the instructions being executable to:

communicate with a source evolved Node B (eNB) using a plurality of component carriers;

receive a commands to make measurements on a target eNB;

measure time/frequency resources;

send results of the measurements on the time/frequency resources to the source eNB;

wherein the source eNB initiates a determination of a target component carrier (CC) of a target eNB;

wherein the source eNB forwards the results of the measurements on the time/frequency resources to the target eNB;

wherein the source eNB and that target eNB communicate to determine time/frequency resources that the UE will use to make the measurements; and wherein the target CC is for the UE to use following handoff of the UE from the source eNB to the target eNB.

* * * * *